(12) United States Patent
Lee

(10) Patent No.: US 12,498,833 B2
(45) Date of Patent: Dec. 16, 2025

(54) LIGHT EMITTING DISPLAY APPARATUS

(71) Applicant: LG Display Co., Ltd., Seoul (KR)

(72) Inventor: HwiDeuk Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/914,587

(22) Filed: Oct. 14, 2024

(65) Prior Publication Data

US 2025/0216993 A1 Jul. 3, 2025

(30) Foreign Application Priority Data

Dec. 29, 2023 (KR) ........................ 10-2023-0197255

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 3/0445* (2019.05); *G06F 2203/04111* (2013.01); *G06F 2203/04112* (2013.01)

(58) Field of Classification Search
CPC ............ G06F 3/044–0448; G09G 2203/04111
See application file for complete search history.

(56) References Cited

U.S. PATENT DOCUMENTS

| | | | | |
|---|---|---|---|---|
| 8,553,161 B2 * | 10/2013 | Song | ..................... | G06F 3/0412 349/12 |
| 8,654,094 B2 * | 2/2014 | Bae | ..................... | G06F 3/0448 345/173 |
| 8,780,078 B2 * | 7/2014 | Kim | ..................... | G06F 3/0443 345/173 |
| 8,970,537 B1 * | 3/2015 | Shepelev | .......... | G06F 3/041662 345/173 |
| 9,024,913 B1 * | 5/2015 | Jung | ..................... | G09G 3/3655 345/174 |
| 9,081,457 B2 * | 7/2015 | Solven | .................. | G06F 3/0446 |
| 9,245,490 B1 * | 1/2016 | Cho | ..................... | G06F 3/0443 |
| 9,250,731 B2 * | 2/2016 | Kim | ..................... | G06F 3/041 |
| 9,471,168 B2 * | 10/2016 | Hu | ..................... | G06F 3/0443 |
| 9,715,313 B2 * | 7/2017 | Ye | ..................... | G06F 3/0412 |
| 10,444,924 B2 * | 10/2019 | Kim | ..................... | G09G 3/3696 |
| 11,079,882 B2 * | 8/2021 | Vaze | ..................... | G06F 3/0443 |
| 11,334,203 B2 * | 5/2022 | Kim | ..................... | G06F 3/04164 |
| 11,467,680 B2 * | 10/2022 | Jeon | ..................... | G06F 3/04886 |
| 11,487,396 B2 * | 11/2022 | Shim | ..................... | G06F 3/04166 |
| 11,526,247 B2 * | 12/2022 | Kim | ..................... | G06F 3/04186 |

(Continued)

FOREIGN PATENT DOCUMENTS

KR 10-2018-0014914 A 2/2018
KR 10-2022-0012664 A 2/2022

*Primary Examiner* — Patrick F Marinelli
(74) *Attorney, Agent, or Firm* — Fenwick & West LLP

(57) ABSTRACT

A light emitting display apparatus is disclosed which senses a touch by using touch receiving electrodes and one touch driving electrode corresponding to the touch receiving electrodes. The light emitting display apparatus comprises a light emitting device unit including light emitting devices; and a touch electrode unit disposed on the light emitting device unit, wherein the touch electrode unit includes: touch receiving electrodes separated from each other; and a touch driving electrode disposed to be spaced apart from the touch receiving electrodes and corresponding to the touch receiving electrodes.

14 Claims, 17 Drawing Sheets

(56) References Cited

U.S. PATENT DOCUMENTS

| | | | |
|---|---|---|---|
| 11,852,925 B2* | 12/2023 | Cheng | G02F 1/13396 |
| 11,966,549 B2* | 4/2024 | Kim | G06F 3/0448 |
| 12,093,485 B2* | 9/2024 | Kim | G06F 3/0418 |
| 12,169,616 B2* | 12/2024 | Zha | G06F 3/0412 |
| 12,265,677 B1* | 4/2025 | Ko | H10K 59/40 |
| 2011/0242444 A1* | 10/2011 | Song | G06F 3/0412 |
| | | | 438/30 |
| 2014/0063370 A1* | 3/2014 | Ko | G02F 1/13338 |
| | | | 174/253 |
| 2014/0111466 A1* | 4/2014 | Kim | G06F 3/0412 |
| | | | 345/174 |
| 2014/0132526 A1* | 5/2014 | Lee | G06F 3/0443 |
| | | | 345/173 |
| 2014/0168149 A1* | 6/2014 | Han | G06F 3/0412 |
| | | | 345/174 |
| 2014/0340210 A1* | 11/2014 | Wakuda | G06F 3/0488 |
| | | | 340/407.2 |
| 2015/0002421 A1* | 1/2015 | Kim | G06F 3/0416 |
| | | | 345/173 |
| 2015/0054777 A1* | 2/2015 | Hashimoto | G06F 3/0443 |
| | | | 345/174 |
| 2015/0060255 A1* | 3/2015 | Chen | H03K 17/9622 |
| | | | 200/5 R |
| 2015/0062062 A1* | 3/2015 | Han | G06F 3/0446 |
| | | | 345/174 |
| 2015/0116265 A1* | 4/2015 | Xie | G06F 3/0443 |
| | | | 345/174 |
| 2016/0018935 A1* | 1/2016 | Wei | H10D 30/6723 |
| | | | 345/173 |
| 2016/0103535 A1* | 4/2016 | Hu | G06F 3/0412 |
| | | | 345/174 |
| 2016/0188034 A1* | 6/2016 | Bayramoglu | G06F 3/0446 |
| | | | 345/174 |
| 2016/0216795 A1* | 7/2016 | Cheung | G06F 3/0446 |
| 2017/0003792 A1* | 1/2017 | Berget | G06F 3/04166 |
| 2017/0255295 A1* | 9/2017 | Tanemura | G06F 1/3262 |
| 2018/0011572 A1* | 1/2018 | Wang | G06F 3/0412 |
| 2019/0018522 A1* | 1/2019 | Kim | G09G 3/3696 |
| 2019/0034003 A1* | 1/2019 | Zeng | G06F 3/04164 |
| 2020/0097127 A1* | 3/2020 | Kim | G06F 3/0443 |
| 2020/0210025 A1* | 7/2020 | Kim | G06F 3/0443 |
| 2020/0218379 A1* | 7/2020 | Lee | H10K 50/844 |
| 2021/0200355 A1* | 7/2021 | Park | G06F 3/0412 |
| 2021/0382570 A1* | 12/2021 | Jeon | G06F 3/04842 |
| 2022/0027012 A1* | 1/2022 | Kim | G06F 3/0448 |
| 2022/0066594 A1* | 3/2022 | Shim | G06F 3/04182 |
| 2022/0206614 A1* | 6/2022 | Lee | G06F 3/0445 |
| 2022/0206663 A1* | 6/2022 | Kim | G09G 3/3655 |
| 2023/0011279 A1* | 1/2023 | Blondin | G06F 3/047 |
| 2023/0110873 A1* | 4/2023 | Crespi | G06V 40/1318 |
| 2023/0161445 A1* | 5/2023 | Kim | G02F 1/13338 |
| 2023/0205336 A1* | 6/2023 | Kim | G06F 3/04164 |
| | | | 345/173 |
| 2023/0229259 A1* | 7/2023 | Kim | G06F 3/0446 |
| | | | 345/173 |
| 2023/0367410 A1* | 11/2023 | Kim | G09G 3/2092 |
| 2024/0036675 A1* | 2/2024 | Jeon | G06F 3/04166 |
| 2024/0152231 A1* | 5/2024 | Kim | G06F 3/0443 |
| 2024/0168583 A1* | 5/2024 | Kim | G06F 3/04166 |
| 2024/0231547 A1* | 7/2024 | Kim | G02F 1/13439 |
| 2024/0377915 A1* | 11/2024 | Blondin | G06F 3/0445 |

* cited by examiner

LIGHT EMITTING DISPLAY APPARATUS

CROSS-REFERENCE TO RELATED APPLICATION

This application claims priority to Republic of Korea Patent Application No. 10-2023-0197255 filed on Dec. 29, 2023, which is hereby incorporated by reference in its entirety.

BACKGROUND

Field of Technology

The present disclosure relates to a light emitting display apparatus.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images. A light emitting display panel configuring a light emitting display apparatus is provided with pixels, and each pixel is provided with an opening portion through which light is output.

A light emitting display apparatus can be provided with a touch panel. In this case, as the area of a light emitting display apparatus increases, a load on touch electrodes provided on a touch panel increases, and accordingly, touch sensitivity can decrease.

SUMMARY

Accordingly, the present disclosure is directed to providing a light emitting display apparatus that substantially obviates one or more problems due to limitations and disadvantages of the related art.

An embodiment of the present disclosure is directed to providing a light emitting display apparatus which senses a touch by using touch receiving electrodes and one touch driving electrode corresponding to the touch receiving electrodes.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a light emitting display apparatus comprising: a light emitting device unit including a plurality of light emitting devices; and a touch electrode unit on the light emitting device unit, the touch electrode unit including: a plurality of touch receiving electrodes that are separated from each other; and a touch driving electrode that is spaced apart from the plurality of touch receiving electrodes and overlaps the plurality of touch receiving electrodes.

In one embodiment, a light emitting display apparatus comprises: a light emitting device unit including a plurality of light emitting devices; and a touch electrode unit on the light emitting device unit, the touch electrode unit including: a touch driving electrode configured to receive a touch driving signal, the touch driving electrode comprising a plurality of sides; and a plurality of touch receiving electrodes that are separated from each other, the plurality of touch receiving electrodes overlapping the touch driving electrode such that the plurality of touch receiving electrodes are disposed in an area enclosed by the plurality of sides of the touch driving electrode in a plan view of the light emitting display apparatus.

It is to be understood that both the foregoing general description and the following detailed description of the present disclosure are example and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
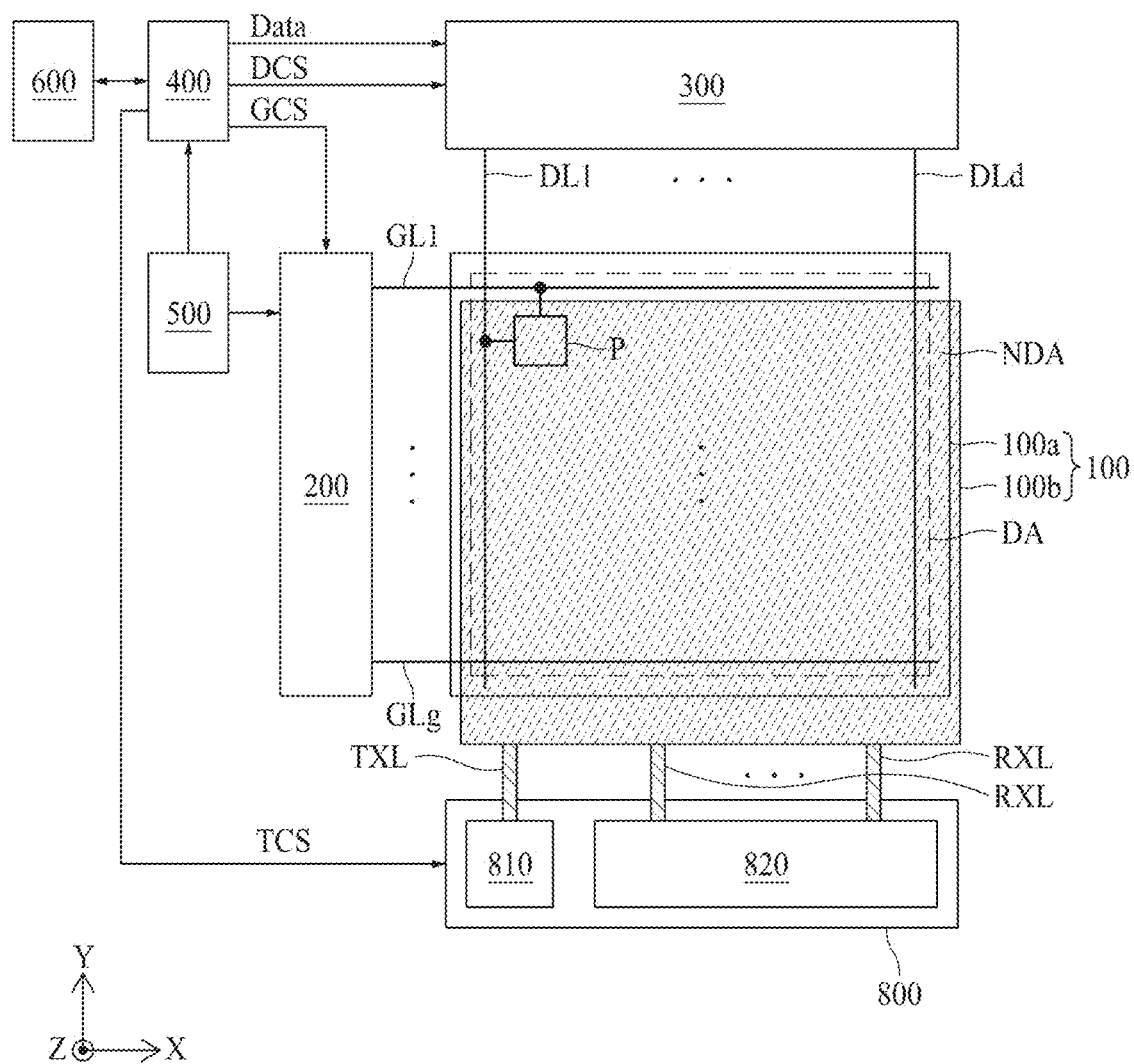
FIG. 1 is an exemplary diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another and may not define order of sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. As for the expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. Also, the term "can" used herein includes all meanings and definitions of the word "may."

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
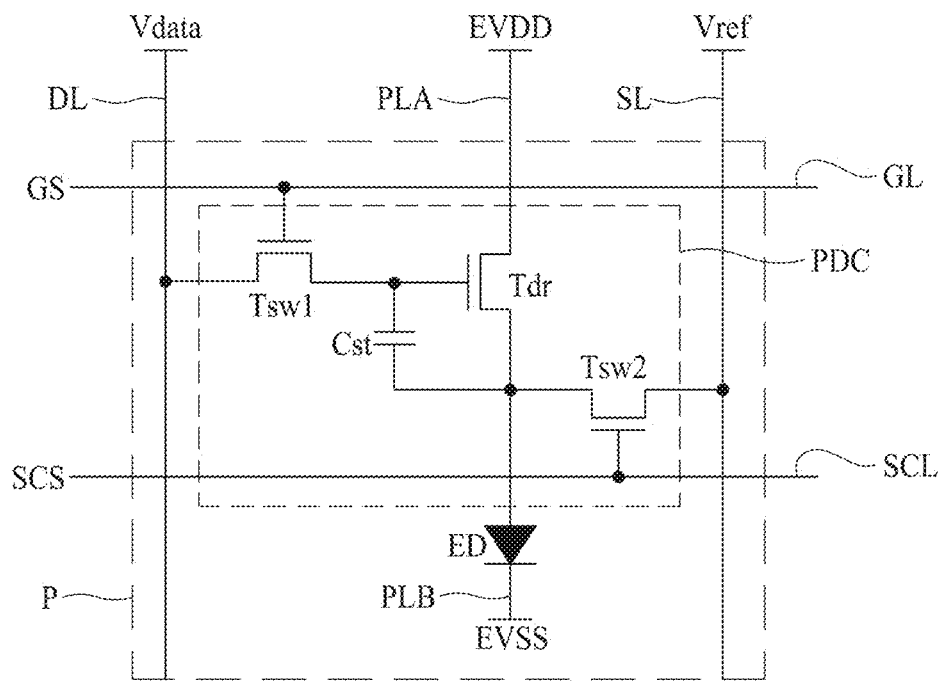
FIG. 2 is an exemplary diagram illustrating a structure of a pixel applied to a light emitting display apparatus according to an embodiment of the present disclosure.
Figure 3:
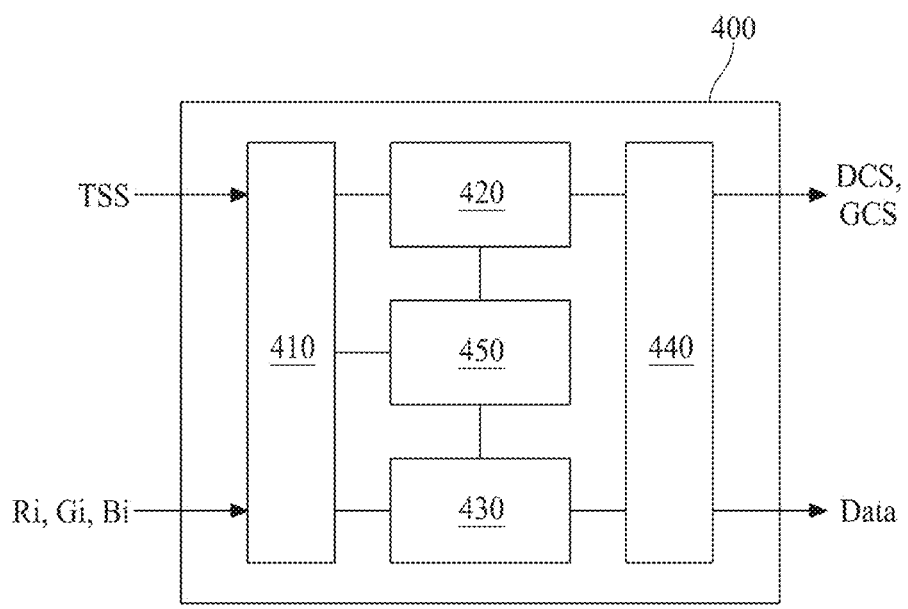
FIG. 3 is an exemplary diagram illustrating a structure of a control driver applied to a light emitting display apparatus according to an embodiment of the present disclosure.
Figure 4:
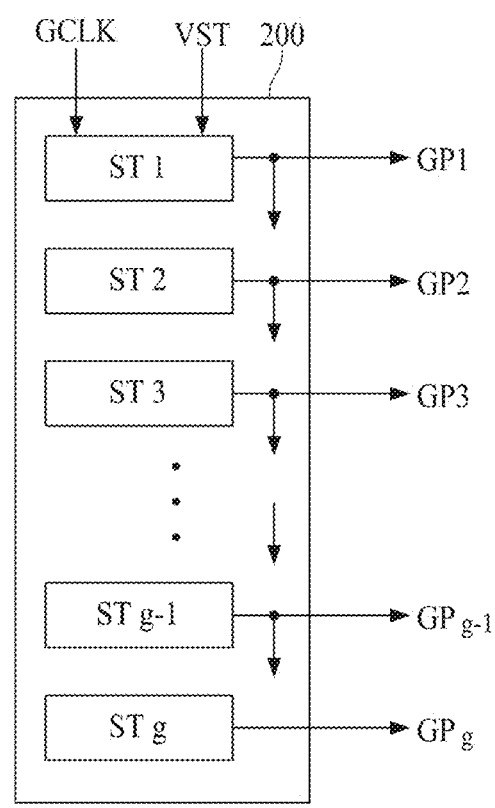
FIG. 4 is an exemplary diagram illustrating a structure of a gate driver applied to a light emitting display apparatus according to an embodiment of the present disclosure.
Figure 5:
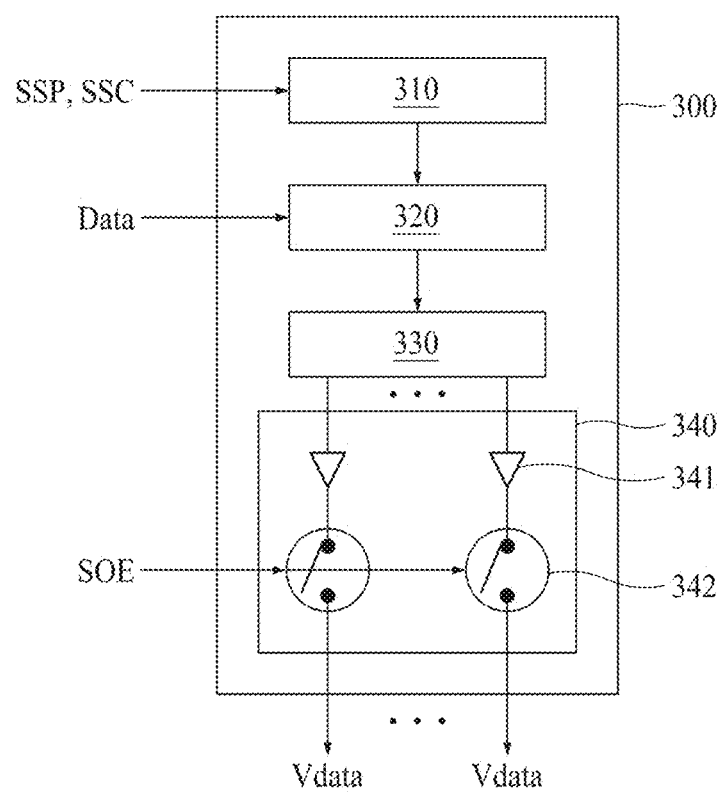
FIG. 5 is an exemplary diagram illustrating a structure of a data driver applied to a light emitting display apparatus according to an embodiment of the present disclosure.

FIG. 1 is an exemplary diagram illustrating a configuration of a light emitting display apparatus according to an embodiment of the present disclosure, FIG. 2 is an exemplary diagram illustrating a structure of a pixel applied to a light emitting display apparatus according to an embodiment of the present disclosure, FIG. 3 is an exemplary diagram illustrating a structure of a control driver applied to a light emitting display apparatus according to an embodiment of the present disclosure, FIG. 4 is an exemplary diagram illustrating a structure of a gate driver applied to a light emitting display apparatus according to an embodiment of the present disclosure, and FIG. 5 is an exemplary diagram illustrating a structure of a data driver applied to a light emitting display apparatus according to an embodiment of the present disclosure.

A light emitting display apparatus according to an embodiment of the present disclosure can be used as various kinds of electronic devices. Electronic devices can be, for example, televisions, monitors, etc.

The light emitting display apparatus according to an embodiment of the present disclosure, as illustrated in FIG. 1, can include a light emitting display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display panel 100, a touch driver 800 which supplies a touch driving signal to touch driving electrode provided in the light emitting display panel 100, a control driver 400 which controls driving of the gate driver 200, the data driver 300, and the touch driver 800, and a power supply unit 500 (e.g., a circuit) which supplies power to the control driver 400, the gate driver 200, the data driver 300, the touch driver 800, and the light emitting display panel 100.

Frist, the light emitting display panel 100 includes a light emitting device unit 100a displaying an image and a touch electrode unit 100b including touch electrodes.

The light emitting device unit 100a can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA.

The pixel P included in the light emitting device unit 100a, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility of an electrical charge (for example, an electron), or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the reference voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

The structure of the pixel P applied to a light emitting display apparatus according to an embodiment of the present disclosure is not limited to the structure illustrated in FIG. 2. Accordingly, the structure of the pixel P can be changed to various shapes.

The touch electrode unit 100b performs a function of sensing a touch, and to this end, the touch electrode unit includes a plate-shaped touch driving electrode and touch receiving electrodes separated from each other.

In this case, the touch driving electrode can be connected to the touch driver 800 through a touch driving electrode line TXL, and the touch receiving electrodes can be connected to the touch driver 800 through touch receiving electrode lines RXL.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 which realigns input image data Ri, Gi, and Bi to generate image data Data, a control signal generator 420 which generates the gate control signal GCS and the data control signal DCS by using the timing synchronization signal TSS, an input unit 410 which transmits the timing synchronization signal TSS transmitted from the external system 600 to the control signal generator 420 and transmits the input image data Ri, Gi, and Bi transmitted from the external system 600 to the data aligner 430, and an output unit 440 which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply unit 500.

The control signal generator 420 can generate a touch control signal TCS supplied to the touch driver 800.

The control driver 400 can further include a storage unit for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information and image information over a communication network and can transmit the received image information to the control driver 400. For example, the external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, the touch driver 800, and the light emitting device unit 100a.

The gate driver 200 can be directly embedded into the non-display area NDA by using a gate-in panel (GIP) type, or the gate driver 200 can be provided in the display area DA in which light emitting devices ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage cannot be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the light emitting display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Figure 6A:
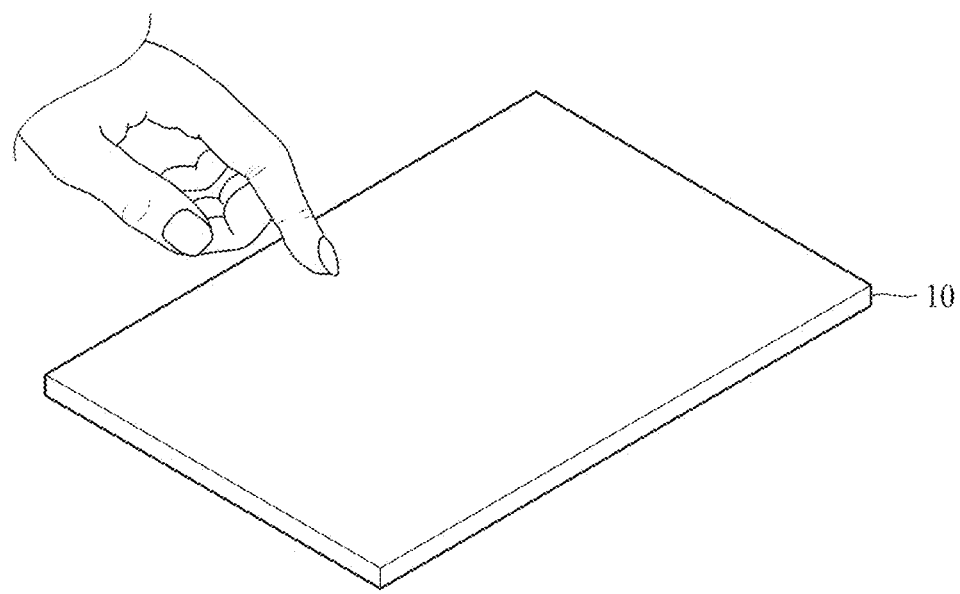
FIG. 6A is an exemplary diagram illustrating a method of using a light emitting display apparatus according to an embodiment of the present disclosure.
Figure 6B:
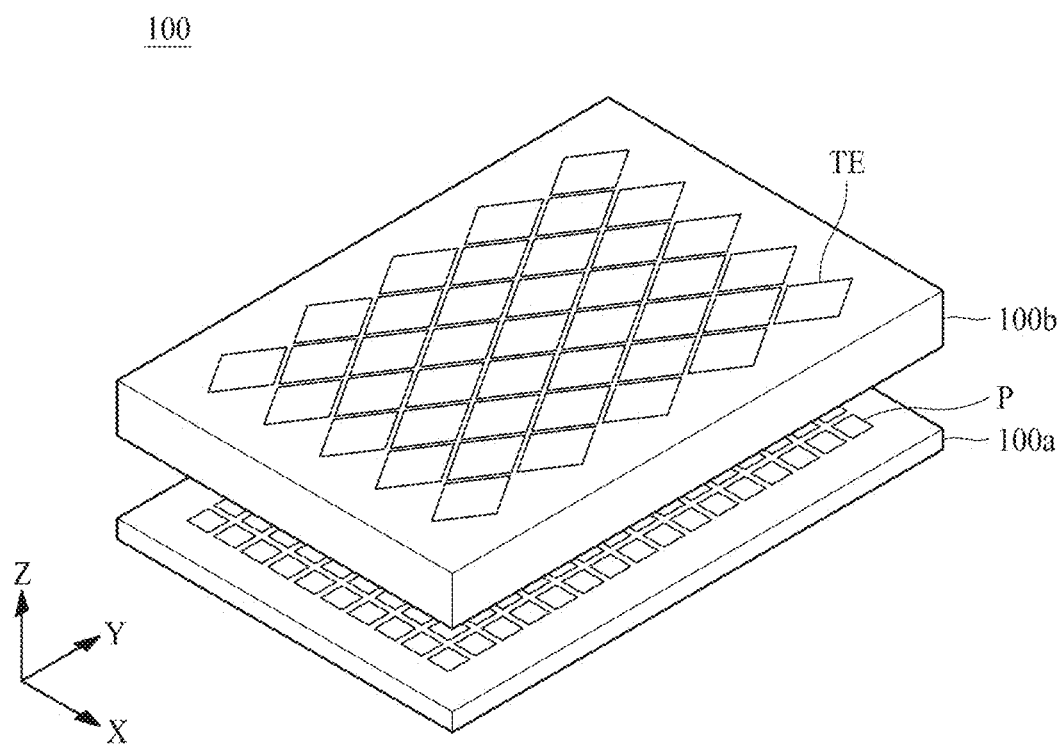
FIG. 6B is an exemplary diagram illustrating a structure of a light emitting display panel applied to a light emitting display apparatus according to an embodiment of the present disclosure.

FIG. 6A is an exemplary diagram illustrating a method of using a light emitting display apparatus according to an embodiment of the present disclosure, and FIG. 6B is an exemplary diagram illustrating a structure of a light emitting display panel applied to a light emitting display apparatus according to an embodiment of the present disclosure.

As illustrated in FIG. 6A, a light emitting display apparatus 10 according to an embodiment of the present disclosure can sense a touch by a user's finger, and to this end, a user's finger can be in contact with a light emitting display apparatus 10 according to an embodiment of the present disclosure.

For example, a light emitting display apparatus 10 according to an embodiment of the present disclosure can determine whether a finger is touched by using a change in capacitance generated between the touch driving electrode and the touch receiving electrode.

In this case, when a finger is in contact, a magnitude of the capacitance generated between the touch driving electrode and the touch receiving electrode can be changed, and the light emitting display apparatus can determine a touch position and whether or not a finger is touched by using the changed capacitance.

Therefore, even when a touch pen using the capacitive method is in contact, the light emitting display apparatus can determine whether the touch pen is touched and the touch position.

To this end, as illustrated in FIG. 6B, the light emitting display panel 100 can include the light emitting device unit 100a on which an image is displayed and the touch electrode unit 100b provided with touch electrodes TE for touch sensing.

The light emitting device unit 100a can include pixels P, data lines DL1 to DLd, and gate lines GL1 to GLg. Each of the pixels P can include a light emitting device ED and a pixel driving circuit PDC. As light is output from the light emitting devices ED, an image can be displayed in the light emitting device unit 100a.

The touch electrode unit 100b can include touch electrodes TE. The touch electrodes TE can include touch driving electrode and touch receiving electrodes. That is, the touch electrode unit 100b can include touch driving electrode and touch receiving electrodes.

In this case, the touch electrode unit 100b can be provided inside the light emitting device unit 100a or on an encapsulation layer of the light emitting device unit 100a.

Figure 7:
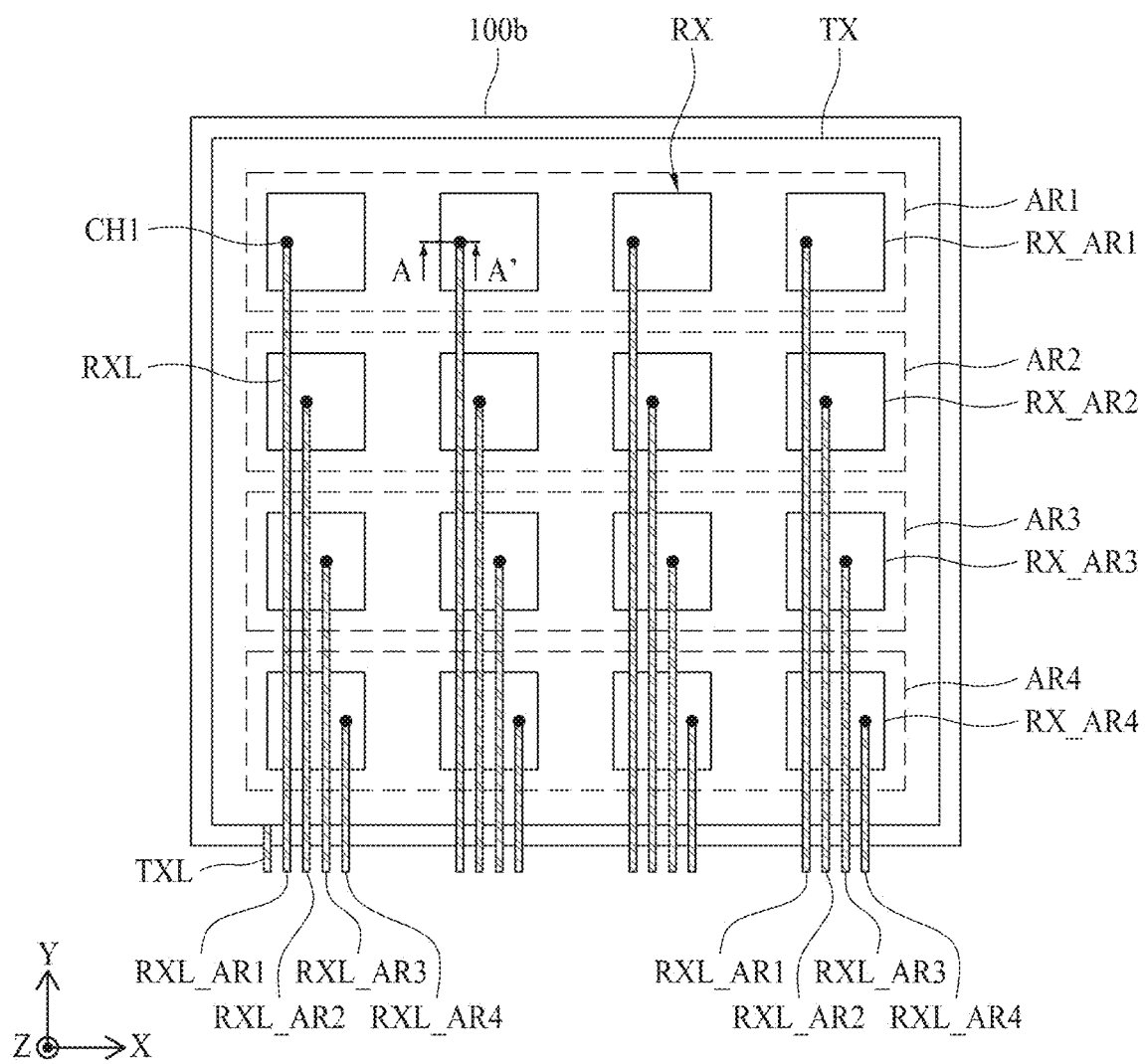
FIG. 7 is an exemplary diagram illustrating a structure of a touch electrode unit applied to a light emitting display apparatus according to an embodiment of the present disclosure.
Figure 8A:
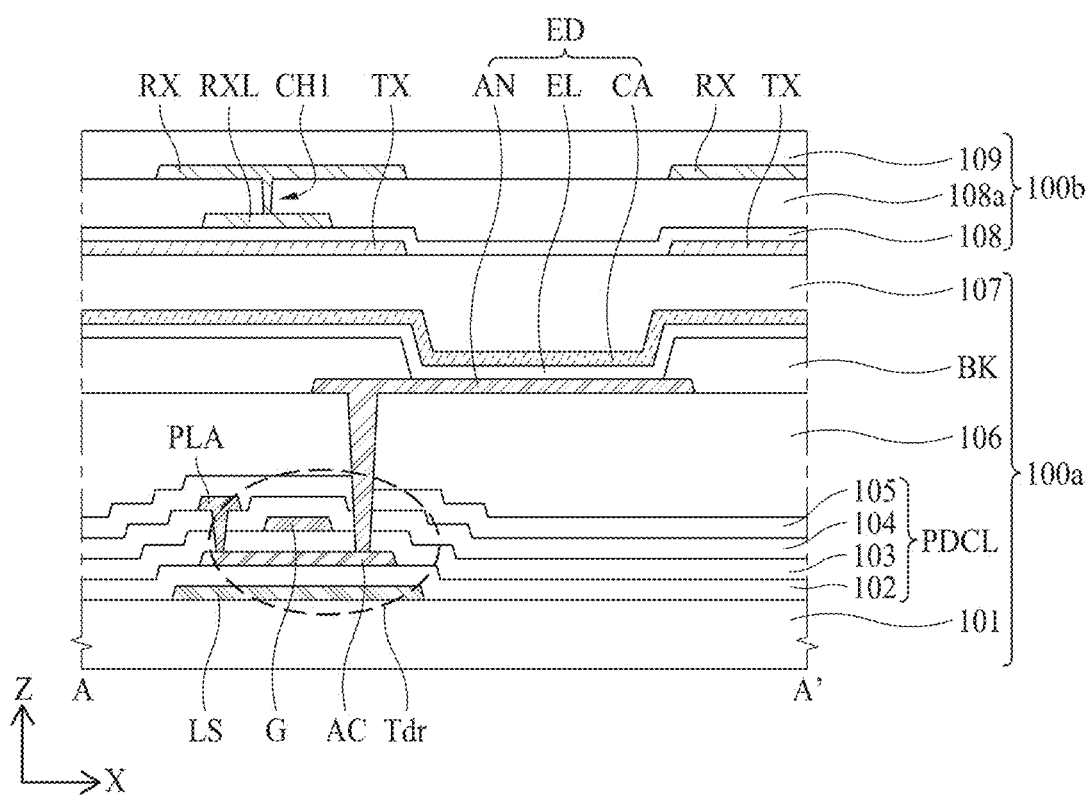
FIGS. 8A and 8B are exemplary diagrams illustrating a cross-sectional surface taken along line A-A' illustrated in FIG. 7 according to an embodiment of the present disclosure.
Figure 8B:
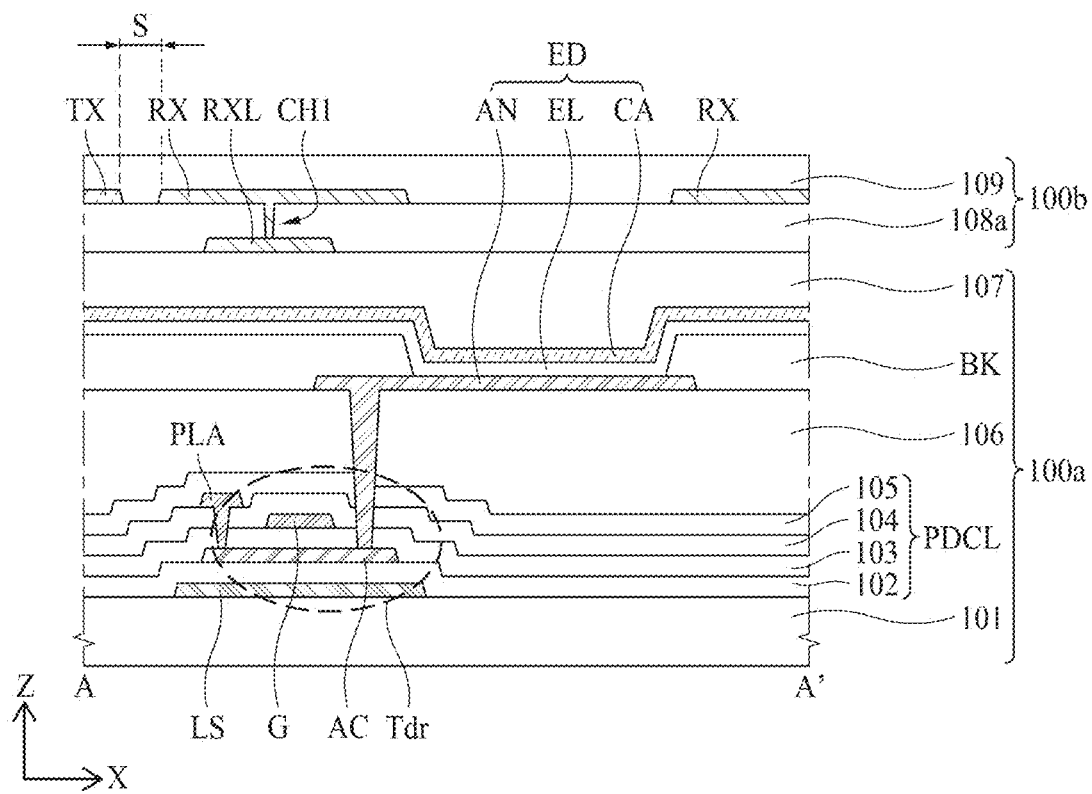

FIG. 7 is an exemplary diagram illustrating a structure of a touch electrode unit applied to a light emitting display apparatus according to an embodiment of the present disclosure, and FIGS. 8A and 8B are exemplary diagrams illustrating a cross-sectional surface taken along line A-A' illustrated in FIG. 7 according to an embodiment of the present disclosure.

The light emitting display panel 100 can include, for example, a light emitting device unit 100a on which an image is displayed and a touch electrode unit 100b provide on the light emitting device unit 100a and provide for sensing a touch, as illustrated in FIGS. 7, 8A, and 8B.

First, the light emitting device unit 100a includes pixels P, and each of the pixels P can include a light emitting device ED, a pixel driving circuit PDC, a gate line GL, and a data line DL.

For example, the light emitting device unit 100a can include, as illustrated in FIGS. 8A and 8B, a substrate 101, a pixel driving circuit layer PDCL provided on the substrate 101, a planarization layer 106 covering the pixel driving circuit layer PDCL, an anode AN provided on the planarization layer, a bank BK covering ends of the anode AN, a light emitting layer EL covering the anode AN and the bank BK, a cathode CA covering the light emitting layer, and an encapsulation layer 107 covering the cathode CA.

The substrate 101 can be any one of a glass substrate, a plastic substrate, and a flexible substrate.

The pixel driving circuit layer PDCL can be provided on the substrate 101. The pixel driving circuit layer PDCL can include the transistors Tsw1, Tsw2, and Tdr and the capacitor Cst described with reference to FIG. 2.

For example, the transistors Tsw1, Tsw2, and Tdr and the capacitor Cst described with reference to FIG. 2 can be disposed in the substrate 101.

For example, the light emitting device unit 100a in which only the driving transistor Tdr is provided in the pixel driving circuit layer PDCL is illustrated in FIG. 8A and FIG. 8B, but in addition to the driving transistor Tdr, various transistors and capacitors can be further provided in the pixel driving circuit layer PDCL.

The pixel driving circuit layer PDCL can include at least one electrode layer and at least one insulation layer.

For example, when the driving transistor Tdr includes, as illustrated in FIGS. 8A and 8B, an active AC, a gate insulation layer 103, and a gate electrode G, the pixel driving circuit layer PDCL can include a first electrode layer including the active AC, a second electrode layer including the gate electrode, a first insulation layer including the gate insulation layer 103, a second insulation layer including a first passivation layer 104 covering the gate electrode G, and a third insulation layer including a second passivation layer 105 covering the first passivation layer 104.

The active AC can be formed of a semiconductor, and both ends of the active AC can be first and second terminals of the driving transistor Tdr.

As described above, the first terminal of the driving transistor Tdr can be connected to the first voltage supply line PLA to which the first voltage EVDD is supplied, the second terminal of the driving transistor Tdr can be connected to the light emitting device ED, and in particular, can be connected to the anode AN configuring the light emitting device ED.

A light blocking plate LS for blocking light flowing from the substrate 101 can be further provided in an area of the substrate 101 corresponding to the active AC of the driving transistor Tdr. Also, a light blocking plate can be further provided at a lower end of the switching transistor Tsw1 and the sensing transistor Tsw2. The light blocking plate LS can be covered by the buffer 102, and the active AC can be provided on the buffer 102.

Each of the gate insulation layer 103, the first passivation layer 104, and the second passivation layer 105 can be formed of at least one of various types of organic layers, can be formed of at least one of various types of inorganic layers, or can be formed of at least one organic layer and at least one inorganic layer.

The gate electrode can include at least one of various metal materials such as aluminum and tungsten.

The planarization layer 106 can perform a function of planarizing an upper end of the pixel driving circuit layer PDCL. The planarization layer 106 can be formed of at least one of various types of organic layers, can be formed of at least one of various types of inorganic layers, or can be formed of at least one organic layer and at least one inorganic layer.

The anode AN can be provided on the planarization layer 106. The anode AN can be provided for each pixel, and the anodes AN are separated from each other.

The bank BK covers the ends of the anodes AN. The bank BK can be formed of at least one of an organic material and an inorganic material.

Light can be output to the outside through an area of the anode AN that is not covered by the bank BK.

The light emitting layer EL can be provided on the anode AN and the bank BK.

The light emitting layer EL can be covered by the cathode CA.

The cathode CA can be covered by the encapsulation layer 107. The encapsulation layer 107 can perform a function of protecting the light emitting device ED from oxygen or moisture introduced from the outside.

The encapsulation layer 107 can be formed of at least one of various types of organic films, can be formed of at least one of various types of inorganic films, or can be formed of at least one organic film and at least one inorganic film.

A color filter displaying various colors can be provided in the encapsulation layer 107, or can be provided in the planarization layer 106.

Second, the touch electrode unit 100b can include touch electrodes TE for touch sensing, and the touch electrodes TE can include one touch driving electrode TX and touch receiving electrodes RX, as illustrated in FIGS. 7, 8A, and 8B.

For example, the touch electrode unit 100b includes touch receiving electrodes RX separated from each other and one touch driving electrode TX spaced apart from the touch receiving electrodes RX with a touch insulation layer interposed therebetween and corresponding to the touch receiving electrodes RX. Thus, a plurality of touch receiving electrodes RX overlap the one touch driving electrode TX in a plan view of the display device. As shown in FIG. 7, the touch receiving electrodes RX are arranged in a plurality of rows of touch receiving electrodes RX and a plurality of columns of touch receiving electrodes RX and the one touch driving electrode TX overlaps the plurality of rows of touch receiving electrodes RX and the plurality of columns of touch receiving electrodes in the plan view.

As shown in FIG. 7, the touch driving electrode TX comprises a plurality of sides such as an upper side, a left side, a right side, and a lower side in the plan view. In one embodiment, the touch receiving electrodes RX overlap the touch driving electrode TX such that the plurality of touch receiving electrodes RX are disposed in an area enclosed by the plurality of sides of the touch driving electrode in the plan view as shown in FIG. 7. Thus, the plurality of touch receiving electrodes RX do not extend past the plurality of sides of the touch driving electrode TX in the plan view.

A touch receiving electrode line RXL through which a touch sensing signal is transmitted is connected to each of the touch receiving electrodes RX, and a touch driving electrode line TXL through which a touch driving signal is transmitted is connected to the touch driving electrode TX.

Accordingly, the touch driving electrode TX can be connected to the touch driver 800 through the touch driving electrode line TXL, and each of the touch receiving electrodes RX can be connected to the touch driver 800 through the touch receiving electrode line RXL.

The touch driving electrode TX and the touch receiving electrodes RX can be provided in the touch electrode unit 100*b* in various structures.

For example, as illustrated in FIGS. 7 and 8A, the touch electrode unit 100*b* can include one touch driving electrode TX on the encapsulation layer 107 of the light emitting device unit 100*a*, a touch insulation layer 108 covering the touch driving electrode TX, touch receiving electrode lines RXL on the touch insulation layer 108, a line cover layer 108*a* covering the touch receiving electrode lines RXL, touch receiving electrodes RX connected to the touch receiving electrode lines RXL through first contact holes CH1 provided in the line cover layer 108*a* and separated in an island type, and a touch passivation layer 109 covering the touch receiving electrodes RX.

First, the touch driving electrode TX can be formed in a shape of a single plate, and can be provided on the entire surface of the touch electrode unit 100*b*.

The touch driving electrode TX can be formed of at least one of various types of transparent electrodes, can be formed of at least one of various types of opaque electrodes, or can be formed of at least one transparent electrode and at least one opaque electrode.

In this case, in order to prevent the light output from the light emitting device ED from being blocked by the touch driving electrode TX, or to improve the output efficiency of the light output from the light emitting device ED, the touch driving electrode TX may not be provided in an area where the anode AN is provided, as illustrated in FIG. 8A. For example, holes passing through the touch driving electrode TX can be formed in areas corresponding to the anodes AN among the touch driving electrode TX.

To provide an additional description, the touch driving electrode TX can be formed in an area other than areas (or light emitting areas) in which the anodes AN are provided, and thus can have a mesh structure. In particular, the touch driving electrode TX having a mesh structure can be provided in an area overlapping the bank BK.

Next, the touch driving electrode TX can be covered by the touch insulation layer 108.

Next, touch receiving electrode lines RXL connected to touch receiving electrodes can be provided in the touch insulation layer 108. The touch receiving electrode lines RXL can be connected to the touch driver 800.

The touch receiving electrode lines RXL can be provided along a second direction different from a first direction X of the light emitting device unit 100*a*. Here, the first direction X can mean the X-axis direction illustrated in FIGS. 1, 7, and 8A, and the second direction Y can mean the Y-axis direction illustrated in FIGS. 1, 7, and 8A.

Next, the touch receiving electrode lines RXL can be covered by the line cover layer 108*a*.

Next, the touch receiving electrodes RX separated in an island type can be provided on the line cover layer 108*a*.

The touch receiving electrode RX can be formed of at least one of various types of transparent electrodes, can be formed of at least one of various types of opaque electrodes, or can be formed of at least one transparent electrode and at least one opaque electrode.

In this case, in order to prevent the light output from the light emitting device ED from being blocked by the touch receiving electrode RX, or to improve the output efficiency of light output from the light emitting device ED, the touch receiving electrode RX may not be provided in an area where the anode AN is provided, as illustrated in FIG. 8A. For example, holes passing through the touch receiving electrode RX can be formed in areas corresponding to the anodes AN among the touch receiving electrode RX.

To provide an additional description, when one touch receiving electrode RX is provided continuously in at least two pixels, holes passing through the touch receiving electrode RX can be formed in areas corresponding to at least two anodes AN provided in at least two pixels, among the touch receiving electrode RX.

Moreover, two different touch receiving electrodes RX can be spaced apart from each other with an anode AN interposed therebetween.

To provide an additional description, each of the touch receiving electrodes RX can be formed in an area other than an area in which the anodes AN are provided, and thus can have a mesh structure. In particular, the touch receiving electrode RX having a mesh structure can be provided in an area overlapping the bank BK.

The touch receiving electrode RX can be connected to the touch receiving electrode line RXL through a first contact hole CH1 provided in the line cover layer 108*a*.

Each of the touch receiving electrodes RX can be formed in a shape such as a diamond and a square, and can be formed in any one of various shapes of polygons. In particular, polygonal shapes such as a diamond and a square can be implemented in a mesh structure.

Finally, the touch receiving electrodes RX can be covered by the touch passivation layer 109.

In the above description, the touch electrode unit 100*b* in which the touch driving electrode TX is provided on the encapsulation layer 107 of the light emitting device unit 100*a* and the touch receiving electrode RX is provided on the touch driving electrode TX has been described.

However, the touch receiving electrodes RX can be provided on the encapsulation layer of the light emitting device unit 100*a*, and the touch driving electrode TX can be provided on the touch receiving electrode RX.

Moreover, the touch driving electrode TX and the touch receiving electrode RX can be provided on the light emitting device unit 100*a* in various stacked structures in addition to the stacked structure described with reference to FIG. 8A.

Hereinafter, another stacked structure of the touch electrode unit 100*b* will be described with reference to FIGS. 7 and 8B. In the following descriptions, details that are the same as or similar to details described with reference to FIGS. 7 and 8A will be omitted or briefly described.

For example, as illustrated in FIGS. 7 and 8B, the touch electrode unit 100*b* includes one touch driving electrode TX provided on the entire touch electrode unit 100*b* and touch receiving electrodes RX formed on the same layer as the touch driving electrode TX and provided in opening portions formed in the touch driving electrode TX. Thus, the touch driving electrode TX surrounds the touch receiving electrodes RX.

More specifically, the touch electrode unit 100*b* can include touch receiving electrode lines RXL provided on the encapsulation layer 107 of the light emitting device unit 100*a*, a line cover layer 108*a* covering the touch receiving electrode lines RXL, a touch driving electrode TX which is provided on the line cover layer 108*a*, forms one electrode, and includes opening portions, a touch receiving electrode RX which is provided on the line cover layer 108*a*, provided in the opening portions formed in the touch driving electrode TX, connected to the touch receiving electrode line RXL through the first contact holes CH1 provided in the line cover layer 108*a*, and separated in an island type, and a touch passivation layer 109 covering the touch driving electrode TX and the touch receiving electrodes RX. In this case, one opening portion formed in the touch driving electrode TX is provided with one touch receiving electrode RX, and the touch driving electrode TX and the touch receiving electrode RX are spaced apart by a preset interval S.

First, touch receiving electrode lines RXL connected to the touch receiving electrodes RX can be provided on the encapsulation layer 107. The touch receiving electrode lines RXL can be connected to the touch driver 800.

The touch receiving electrode lines RXL can be provided along the second direction different from the first direction X of the light emitting device unit 100*a*.

In particular, the touch receiving electrode lines RXL are spaced apart from the touch receiving electrode RX and the touch driving electrode TX with the line cover layer 108*a* interposed therebetween. Therefore, the touch receiving electrode line RXL can be provided to overlap at least one touch receiving electrode RX in a different layer from the touch receiving electrode RX.

Next, the touch receiving electrode lines RXL can be covered by the line cover layer 108*a*.

Next, the touch driving electrode TX can be provided on the line cover layer 108*a*.

The touch driving electrode TX can be formed in a single plate shape and can be provided on the entire surface of the touch electrode unit 100*b*. An opening portion in which the touch receiving electrode RX is provided is formed in the touch driving electrode TX. For example, openings portions are provided in one touch driving electrode TX, and a touch receiving electrode RX is provided in each of the opening portions.

The touch driving electrode TX can be formed of at least one of various types of transparent electrodes, can be formed of at least one of various types of opaque electrodes, or can be formed of at least one transparent electrode and at least one opaque electrode.

In this case, in order to prevent light output from the light emitting device ED from being blocked by the touch driving electrode TX, or to improve the output efficiency of light output from the light emitting device ED, the touch driving electrode TX may not be provided in areas where the anodes AN are provided.

To provide an additional description, the touch driving electrode TX can be formed in an area other than areas (or light emitting areas) in which the anodes AN are provided and the opening portion in which a touch receiving electrode RX is provided, in the touch electrode unit 100*b*, and thus can have a mesh structure. In particular, the touch driving electrode TX having a mesh structure can be provided in an area overlapping the bank BK.

Next, touch receiving electrodes RX can be provided on the line cover layer 108*a*.

For example, the touch receiving electrodes RX can be formed on the same layer as the touch driving electrode TX.

In particular, each of the touch receiving electrodes RX can be provided in an opening portion formed in the touch driving electrode TX. Accordingly, the touch receiving electrodes RX can be separated in an island type.

The touch receiving electrode RX can be formed of at least one of various types of transparent electrodes, can be formed of at least one of various types of opaque electrodes, or can be formed of at least one transparent electrode and at least one opaque electrode.

In this case, in order to prevent the light output from the light emitting device ED from being blocked by the touch receiving electrode RX, or to improve the output efficiency of light output from the light emitting device ED, the touch receiving electrode RX may not be provided in an area in which the anodes AN are provided, as illustrated in FIG. 8B. For example, holes passing through the touch receiving electrode RX can be formed in areas corresponding to the anode AN among the touch receiving electrode RX.

To provide an additional description, when one touch receiving electrode RX is provided continuously in at least two pixels, holes passing through the touch receiving electrode RX can be formed in areas corresponding to at least two anodes AN provided in at least two pixels among the touch receiving electrode RX.

To provide an additional description, each of the touch receiving electrodes RX can be formed in an area other than an area in which the anodes AN are provided, and thus can have a mesh structure. In particular, the touch receiving electrode RX having a mesh structure can be provided in an area overlapping the bank BK.

The touch receiving electrode RX can be connected to the touch receiving electrode line RXL through the first contact hole CH1 provided in the line cover layer 108*a*.

Each of the touch receiving electrodes RX can be formed in a shape such as a diamond and a square, and in addition to this, can be formed in any one of various shapes of polygons. In particular, polygonal shapes such as a diamond and a square can be implemented in a mesh structure.

Finally, the touch driving electrodes TX and the touch receiving electrodes RX can be covered by the touch passivation layer 109.

As described above, the touch driving electrode TX and the touch receiving electrode RX can be formed on the same layer, and one touch receiving electrode RX can be provided in each of the opening portions formed in the touch driving electrode TX. In this case, the touch receiving electrode RX provided in the opening portion is spaced apart from the touch driving electrode TX by a preset interval S.

Third, a method of sensing a touch in the light emitting display apparatus described with reference to FIGS. 7, 8A, and 8B is as follows.

First, a touch driving signal generation unit 810 (e.g., a circuit) of the touch driver 800 can generate a touch driving signal under the control of the control driver 400.

The touch driving signal is supplied to the touch driving electrode TX through the touch driving electrode line TXL.

Because the area of the touch driving electrode TX is large, the resistance value of the touch driving electrode TX can be smaller than that of a conventional line-type touch driving electrode. Also, the capacitance value of the touch driving electrode TX can increase. Therefore, a voltage having a magnitude smaller than a voltage of a touch driving signal applied to a conventional light emitting display apparatus can be used as the touch driving signal.

Next, a touch sensing unit 820 (e.g., a circuit) of the touch driver 800 can simultaneously receive touch sensing signals from touch receiving electrode lines RXL connected to the touch receiving electrodes RX, and can convert the received touch sensing signals into digital values.

Finally, a touch control unit of the touch driver 800 or the control driver 400 receiving digital values from the touch driver 800 can determine whether a touch is present and touch coordinates by using the digital values.

For example, the touch receiving electrodes RX overlap the touch driving electrodes TX under the same condition.

In this case, the size of the touch sensing signal received from a touch receiving electrode RX provided in a region where a user's touch occurs can be different from the size of the touch sensing signal received from a touch receiving electrode RX provided in a region where a touch does not occur.

Accordingly, the touch control unit or the control driver 400 can determine whether a touch is present by comparing the sizes of the touch sensing signals.

Moreover, each of the touch receiving electrodes RX illustrated in FIG. 7 can correspond to a preset coordinate. Accordingly, the touch coordinates of a region where a touch occurs can be determined through the coordinates matched with the touch receiving electrode RX where a touch occurs.

Figure 9:
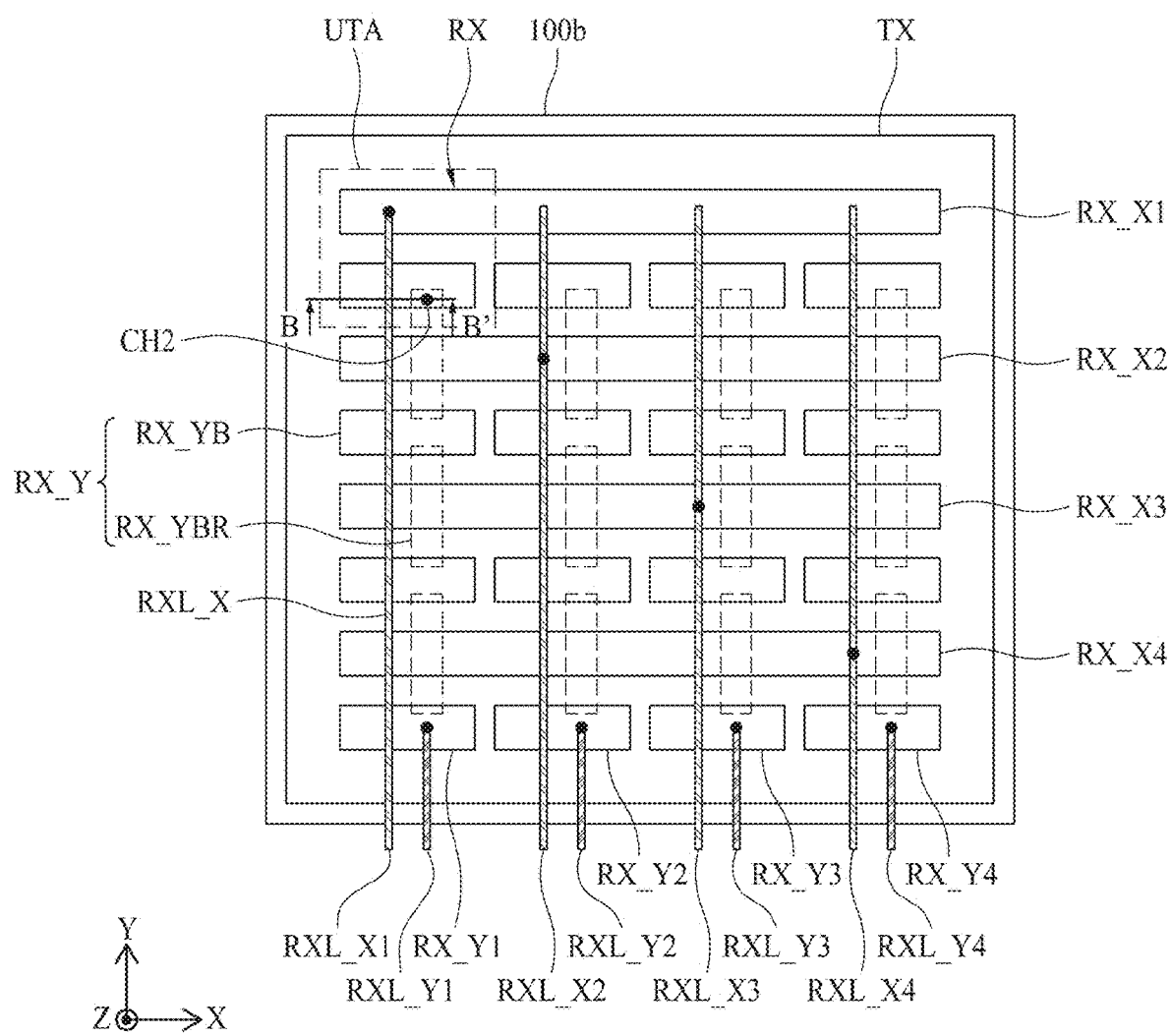
FIG. 9 is another exemplary diagram illustrating a structure of a touch electrode unit applied to a light emitting display apparatus according to an embodiment of the present disclosure.
Figure 10A:
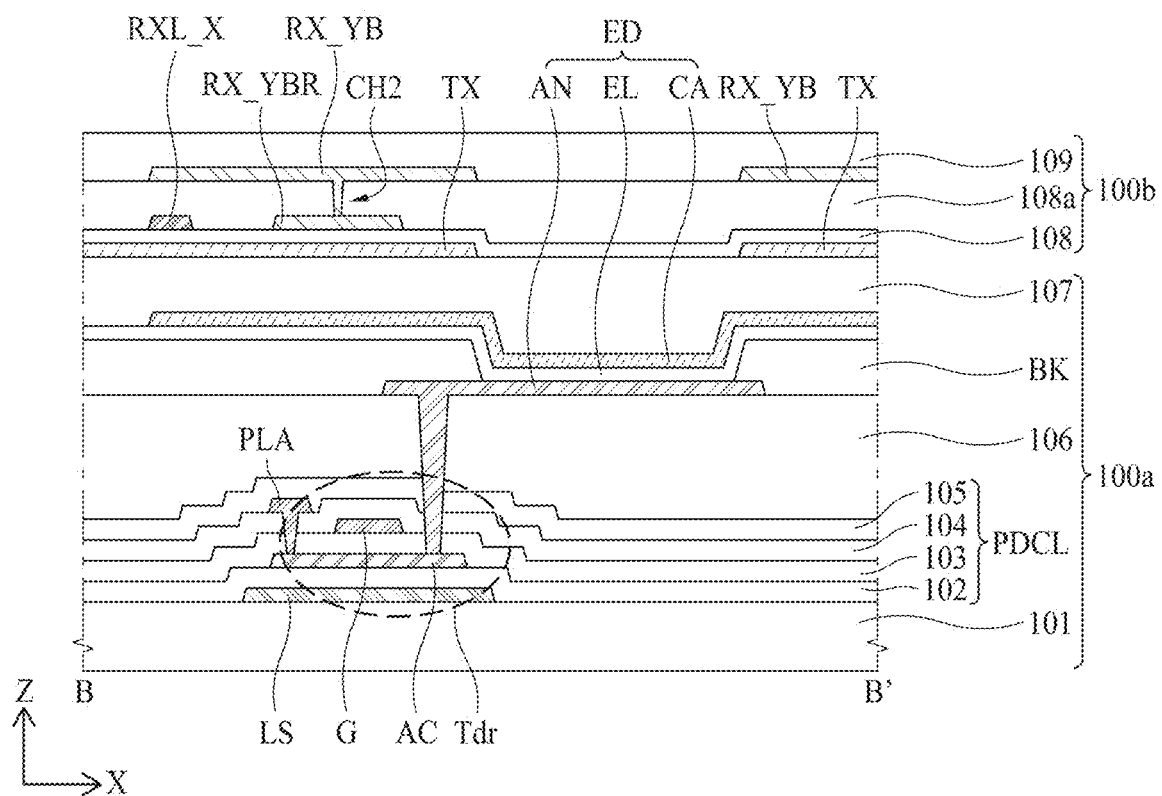
FIGS. 10A and 10B are exemplary diagrams illustrating a cross-sectional surface taken along line B-B' illustrated in FIG. 9 according to an embodiment of the present disclosure.
Figure 10B:
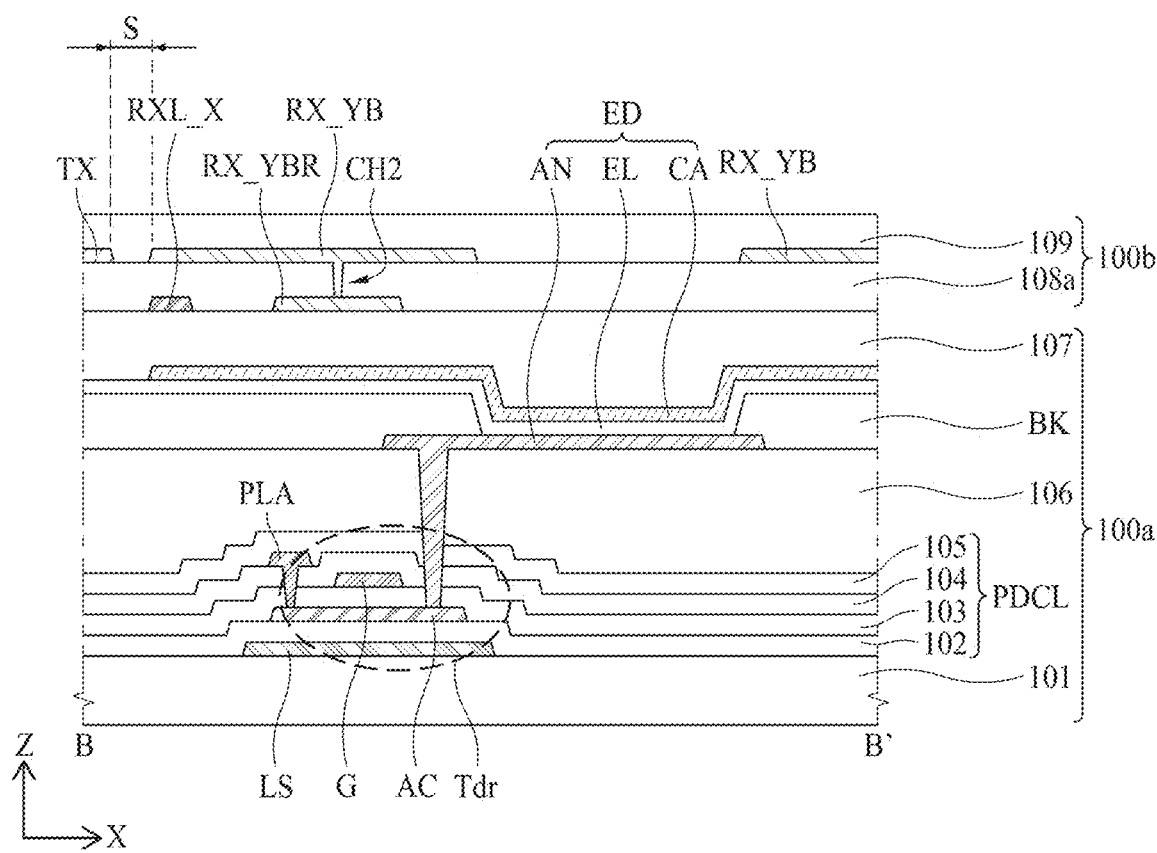

FIG. 9 is another exemplary diagram illustrating a structure of a touch electrode unit applied to a light emitting display apparatus according to an embodiment of the present disclosure, and FIGS. 10A and 10B are exemplary diagrams illustrating a cross-sectional surface taken along line B-B' illustrated in FIG. 9 according to an embodiment of the present disclosure. In the following descriptions, details that are the same as or similar to details described with reference to FIGS. 7, 8A and 8B are omitted or briefly described.

A light emitting display panel 100 can include, for example, a light emitting device unit 100a on which an image is displayed and a touch electrode unit 100b provided on the light emitting device unit 100a and for sensing a touch, as illustrated in FIGS. 9, 10A, and 10B.

First, the light emitting device unit 100a includes pixels P, and each of the pixels P can include a light emitting device ED, a pixel driving circuit PDC, a gate line GL, and a data line DL.

For example, the light emitting device unit 100a can include, as illustrated in FIGS. 10A and 10B, a substrate 101, a pixel driving circuit layer PDCL provided on the substrate 101, a planarization layer 106 covering the pixel driving circuit layer PDCL, an anode AN provided on the planarization layer 106, a bank BK covering ends of the anode AN, a light emitting layer EL covering the anode AN and the bank BK, a cathode CA covering the light emitting layer, and an encapsulation layer 107 covering the cathode CA.

Second, the touch electrode unit 100b can include touch electrodes TE for touch sensing, and the touch electrodes TE can, as illustrated in FIGS. 9, 10A, and 10B, include one touch driving electrode TX and touch receiving electrodes RX.

For example, the touch electrode unit 100b includes touch receiving electrodes RX separated from each other and one touch driving electrode TX. The one touch driving electrode TX is spaced apart from the touch receiving electrodes RX with a touch insulation layer 108 interposed therebetween, and corresponds to the touch receiving electrodes RX.

In this case, the touch receiving electrodes RX can include first direction receiving electrodes RX_X1, RX_X2, RX_X3, and RX_X4 and second direction receiving electrodes RX_Y1, RX_Y2, RX_Y3, and RX_Y4, as illustrated in FIG. 9.

In the following description, when it is not necessary to distinguish the first direction receiving electrodes RX_X1, RX_X2, RX_X3, and RX_X4, each of the first direction receiving electrodes RX_X1, RX_X2, RX_X3, and RX_X4 can be represented by a reference numeral RX_X. Also, when it is not necessary to distinguish the second direction receiving electrodes RX_Y1, RX_Y2, RX_Y3, and RX_Y4, each of the second direction receiving electrodes RX_Y1, RX_Y2, RX_Y3, and RX_Y4 can be represented by a reference numeral RX_Y.

The first direction receiving electrodes RX_X extend along a first direction X of the touch electrode unit 100b and are spaced apart from each other along a second direction Y different from the first direction X.

Each of the first direction receiving electrodes RX_X can be formed in a single rod shape.

The second direction receiving electrodes RX_Y extend along the second direction Y and are spaced apart from each other along the first direction X.

Each of the second direction receiving electrodes RX_Y includes at least two second direction block receiving electrodes RX_YB and at least one second direction bridge receiving electrode RX_YBR (or, referred to as a receiving electrode connection line) that connects together the at least two second direction block receiving electrodes RX_YB.

Each of the second direction block receiving electrodes RX_YB is provided between two first direction receiving electrodes RX_X adjacent to each other. That is, each of the second direction block receiving electrodes RX_YB is between a pair of first direction receiving electrodes RX_X.

Each of the second direction bridge receiving electrodes RX_YBR performs a function of connecting the second direction block receiving electrodes RX_YB spaced apart from each other with the first direction receiving electrode RX_X interposed therebetween.

For example, each of the second direction receiving electrodes RX_Y is continuously formed along the second direction Y, and includes the second direction block receiving electrodes RX_YB and the second direction bridge receiving electrodes RX_YBR.

A touch receiving electrode line RXL through which a touch sensing signal is transmitted is connected to each of the touch receiving electrodes RX, and a touch driving electrode line TXL through which a touch driving signal is transmitted is connected to the touch driving electrode TX.

The touch receiving electrode lines RXL can include first direction receiving electrode lines RXL_X and second direction receiving electrode lines RXL_Y.

For example, the first direction receiving electrode lines RXL_X connected to the first direction receiving electrodes RX_X extend in the second direction Y, and the second direction receiving electrode lines RXL_Y connected to the second direction receiving electrodes RX_Y extend in the second direction Y. That is, each first direction receiving electrode line RXL_X is connected to a corresponding first direction receiving electrode from the plurality of first direction receiving electrodes RX_X and each second direction receiving electrode line RXL_Y is connected to a corresponding second direction receiving electrode from the plurality of second direction receiving electrodes RX_Y as shown in FIG. 9.

Accordingly, the touch driving electrode TX can be connected to the touch driver 800 through the touch driving electrode line TXL, and each of the touch receiving electrodes RX can be connected to the touch driver 800 through the first direction receiving electrode line RXL_X or the second direction receiving electrode line RXL_Y.

In this case, one second direction receiving electrode line RXL_Y can be provided between two first direction receiving electrode lines RXL_X adjacent to each other. That is, a second direction receiving electrode line RXL_Y is between a pair of first direction receiving electrode lines RXL_X in a plan view of the light emitting display apparatus.

Accordingly, the first direction receiving electrode RX_X and the second direction block receiving electrode RX_YB adjacent thereto can form one touch coordinate.

The touch driving electrodes TX and the touch receiving electrodes RX can be provided in the touch electrode unit 100b in various structures.

For example, as illustrated in FIGS. 9 and 10A, the touch electrode unit 100b can include a touch driving electrode TX provided on the encapsulation layer 107 of the light emitting device unit 100a, a touch insulation layer 108 covering the touch driving electrode TX, first direction receiving electrode line RXL_X and second direction bridge receiving electrode RX_YBR provided on the touch insulation layer 108, a line cover layer 108a covering the first direction receiving electrode line RXL_X and the second direction bridge receiving electrodes RX_YBR, second direction block receiving electrodes RX_YB connected to the second direction bridge receiving electrodes RX_YBR through second contact holes CH2 provided in the line cover layer 108a, and a touch passivation layer 109 covering the second direction block receiving electrodes RX_YB.

The second direction receiving electrode line RXL_Y can connect the second direction receiving electrode RX_Y to the touch driver 800 in an area adjacent to the touch driver 800.

However, in order for the second direction receiving electrode line RXL_Y to have a resistance equal to or similar to that of the first direction receiving electrode line RXL_X, the second direction receiving electrode line RXL_Y can be provided along the second direction block receiving electrodes RX_YB. In this case, the second direction receiving electrode line RXL_Y can be provided on the touch insulation layer 108 instead of the second direction bridge receiving electrode RX_YBR, and the second direction block receiving electrodes RX_YB can be connected to the second direction receiving electrode line RXL_Y.

First, the touch driving electrode TX can be formed in a shape of a single plate, and can be provided on the entire surface of the touch electrode unit 100b.

The touch driving electrode TX can be formed of at least one of various types of transparent electrodes, can be formed of at least one of various types of opaque electrodes, or can be formed of at least one transparent electrode and at least one opaque electrode.

In this case, in order to prevent the light output from the light emitting device ED from being blocked by the touch driving electrode TX, or to improve the output efficiency of the light output from the light emitting device ED, the touch driving electrode TX may not be provided in a region in which the anodes AN are provided, as illustrated in FIG. 10A. For example, holes passing through the touch driving electrode TX can be formed in regions corresponding to the anodes AN among the touch driving electrode TX.

Next, the touch driving electrode TX can be covered by the touch insulation layer 108.

Next, the first direction receiving electrode lines RXL_X connected to the first direction receiving electrodes RX_X and the second direction bridge receiving electrodes RX_YBR connected to the second direction block receiving electrodes RX_YB can be provided on the touch insulation layer 108.

Next, the first direction receiving electrode lines RXL_X and the second direction bridge receiving electrodes RX_YBR can be covered by the line cover layer 108a.

Next, the first direction receiving electrodes RX_X and the second direction block receiving electrodes RX_YB can be provided on the line cover layer 108a.

Each of the second direction block receiving electrodes RX_YB and second direction bridge receiving electrodes RX_YBR can be formed of at least one of various types of transparent electrodes, can be formed of at least one of various types of opaque electrodes, or can be formed of at least one transparent electrode and at least one opaque electrode.

The second direction block receiving electrode RX_YB and the second direction bridge receiving electrode RX_YBR can be formed of the same material or different materials.

In this case, in order to prevent light output from the light emitting device ED from being blocked by the second direction block receiving electrode RX_YB, or to improve output efficiency of light output from the light emitting device ED, the second direction block receiving electrode RX_YB may not be provided in a region in which the anodes AN are provided, as illustrated in FIG. 10. For example, holes passing through the second direction block receiving electrode RX_YB can be formed in regions corresponding to the anodes AN among the second direction block receiving electrode RX_YB.

To provide an additional description, when one second direction block receiving electrode RX_YB is provided continuously in at least two pixels, holes passing through the second direction block receiving electrode RX_YB can be formed in regions corresponding to at least two anodes AN provided in at least two pixels among the second direction block receiving electrode RX_YB.

Moreover, two different second direction block receiving electrodes RX_YB can be spaced apart from each other with the anode AN interposed therebetween.

The second direction block receiving electrode RX_YB can be connected to the second direction bridge receiving electrode RX_YBR through a second contact hole CH2 provided in the line cover layer 108a.

Each of the second direction block receiving electrodes RX_YB can be formed in a shape such as a diamond and a square, and in addition to this, can be formed in any one of various shapes of polygons.

The first direction receiving electrode RX_X can be formed of the same material as the second direction block receiving electrode RX_YB. Holes passing through the first direction receiving electrode RX_X can be formed in regions corresponding to the anodes AN, in the first direction receiving electrode RX_X as well. Each of the first direction receiving electrodes RX_X can be formed in a shape such as a diamond and a square, and in addition to this, can be formed in any one of various shapes of polygons.

Finally, the first direction receiving electrodes RX_X and the second direction block receiving electrodes RX_YB can be covered by the touch passivation layer 109.

In the above description, the touch electrode unit 100b, in which the touch driving electrode TX is provided on the encapsulation layer 107 of the light emitting device unit 100a, and the first direction receiving electrodes RX_X and the second direction block receiving electrodes RX_YB are provided on the touch driving electrode TX, has been described.

However, the first direction receiving electrodes RX_X and the second direction block receiving electrodes RX_YB can be provided on the encapsulation layer of the light emitting device unit 100a, and the touch driving electrode TX can be provided on the first direction receiving electrodes RX_X and the second direction block receiving electrodes RX_YB.

Moreover, the touch driving electrode TX, the first direction receiving electrode RX_X, and the second direction block receiving electrode RX_YB can be provided on the light emitting device unit 100*a* in various stacked structures in addition to the stacked structure described with reference to FIG. 10A.

Hereinafter, another stacked structure of the touch electrode unit 100*b* will be described with reference to FIGS. 9 and 10B. In the following descriptions, details that are the same as or similar to details described with reference to FIGS. 9 and 10A will be omitted or briefly described.

For example, as illustrated in FIGS. 9 and 10B, the touch electrode unit 100*b* includes one touch driving electrode TX provided on the entire touch electrode unit 100*b* and touch receiving electrodes RX formed on the same layer as the touch driving electrode TX and provided in opening portions formed in the touch driving electrode.

More specifically, the touch electrode unit 100*b* can include first direction receiving electrode lines RXL_X and second direction bridge receiving electrodes RX_YBR provided on the encapsulation layer 107 of the light emitting device unit 100*a*, a line cover layer 108*a* covering the first direction receiving electrode lines RXL_X and the second direction bridge receiving electrodes RX_YBR, a touch driving electrode TX which is provided on the line cover layer 108*a*, forms an electrode, and includes opening portions, first direction receiving electrodes RX_X which are provided on the line cover layer 108*a*, are provided in the opening portions formed in the touch driving electrode TX, and are connected to the first direction receiving electrode RX_X through contact holes provided in the line cover layer 108*a*, and a touch passivation layer 109 covering the touch driving electrode TX, the first direction receiving electrode RX_X, and the second direction block receiving electrode RX_YB. In this case, one opening portion formed in the touch driving electrode TX is provided with one first direction receiving electrode RX_X or one second direction block receiving electrode RX_YB, and the touch driving electrode TX and the first direction receiving electrode RX_X, or the touch driving electrode TX and the second direction block receiving electrode RX_YB are spaced apart by a preset interval S.

First, first direction receiving electrode lines RXL_X connected to the first direction receiving electrodes RX_X and second direction bridge receiving electrodes RX_YBR connected to the second direction block receiving electrodes RX_YB can be provided on the encapsulation layer 107. For example, the two second direction block receiving electrodes RX_YB, which are spaced apart from each other, can be connected to each other by the second direction bridge receiving electrode RX_YBR.

The first direction receiving electrode lines RXL_X and the second direction bridge receiving electrodes RX_YBR can be provided along the second direction Y.

In particular, the first direction receiving electrode lines RXL_X are spaced apart from the first direction receiving electrode RX_X and the second direction block receiving electrode RX_YB with the line cover layer 108*a* interposed therebetween. Therefore, the first direction receiving electrode line RXL_X can be provided to overlap at least one first direction receiving electrode RX_X and at least one second direction block receiving electrode RX_YB in a layer different from the first direction receiving electrodes RX_X and the second direction block receiving electrodes RX_YB.

Next, the first direction receiving electrode lines RXL_X and the second direction bridge receiving electrodes RX_YBR can be covered by the line cover layer 108*a*.

Next, the touch driving electrode TX can be provided on the line cover layer 108*a*.

The touch driving electrode TX, as described above, can be formed in a single plate shape and can be provided on the entire surface of the touch electrode unit 100*b*. An opening portion in which the touch receiving electrode RX is provided is formed in the touch driving electrode TX. For example, openings portions are provided in one touch driving electrode TX, and the first direction receiving electrode RX_X or the second direction block receiving electrode RX_YB can be provided in each of the opening portions.

To provide an additional description, the touch driving electrode TX can be formed in an area other than areas (or light emitting areas) in which the anodes AN are provided and the opening portion in which the first direction receiving electrode RX_X and the second direction block receiving electrode RX_YB are provided, in the touch electrode unit 100*b*, and thus can have a mesh structure. In particular, the touch driving electrode TX having a mesh structure can be provided in an area overlapping the bank BK.

Next, the first direction receiving electrodes RX_X and the second direction block receiving electrodes RX_YB can be provided on the line cover layer 108*a*.

For example, the first direction receiving electrodes RX_X and the second direction block receiving electrodes RX_YB can be formed on the same layer as the touch driving electrode TX.

In particular, each of the first direction receiving electrodes RX_X can be provided in an opening portion formed in the touch driving electrode TX, and each of the second direction block receiving electrodes RX_YB can be formed in another opening portion formed in the touch driving electrode TX. Accordingly, the first direction receiving electrodes RX_X and the second direction block receiving electrodes RX_YB can be separated in an island type.

The touch receiving electrode RX can be formed of at least one of various types of transparent electrodes, can be formed of at least one of various types of opaque electrodes, or can be formed of at least one transparent electrode and at least one opaque electrode.

Each of the first direction receiving electrodes RX_X and the second direction block receiving electrode RX_YB can have a mesh structure. In particular, each of the first direction receiving electrodes RX_X and the second direction block receiving electrode RX_YB having a mesh structure can be provided in a region overlapping the bank BK.

Each of the first direction receiving electrodes RX_X and the second direction block receiving electrodes RX_YB can be formed in a shape such as a diamond and a quadrangle, and in addition to this, can be formed in any one of various shapes of polygons. In particular, polygonal shapes such as a diamond and a quadrangle can be implemented in a mesh structure.

Finally, the touch driving electrode TX, the first direction receiving electrodes RX_X, and the second direction block receiving electrodes RX_YB can be covered by the touch passivation layer 109.

As described above, the touch driving electrode TX, the first direction receiving electrodes RX_X, and the second direction block receiving electrodes RX_YB can be formed on the same layer, and one first direction receiving electrode RX_X or one second direction block receiving electrode RX_YB can be provided in each of the opening portions formed in the touch driving electrode TX. In this case, the first direction receiving electrode RX_X or the second direction block receiving electrode RX_YB provided in the opening portion is spaced apart from the touch driving electrode TX by a preset interval S.

Third, a method of sensing a touch in a light emitting display apparatus described with reference to FIGS. 9 and 10A is as follows.

First, the touch driving signal generation unit 810 of the touch driver 800 can generate a touch driving signal under the control of the control driver 400.

The touch driving signal is supplied to the touch driving electrode TX through the touch driving electrode line TXL.

Because the area of the touch driving electrode TX is large, the resistance value of the touch driving electrode TX can be smaller than that of a conventional line-type touch driving electrode. Therefore, a voltage having a magnitude smaller than a voltage of a touch driving signal applied to a conventional light emitting display apparatus can be used as the touch driving signal.

Next, the touch sensing unit 820 of the touch driver 800 can simultaneously receive touch sensing signals from the first direction receiving electrode lines RXL_X connected to the first direction receiving electrodes RX_X and the second direction receiving electrode lines RXL_Y connected to the second direction receiving electrodes RX_Y, and can convert the received touch sensing signals into digital values.

Finally, the touch control unit of the touch driver 800 or the control driver 400 can determine whether a touch is present and touch coordinates by using the digital values.

For example, the first direction receiving electrodes RX_X and the second direction receiving electrodes RX_Y overlap the touch driving electrode TX under the same condition.

In this case, the size of a touch sensing signal received from a touch receiving electrode RX provided in a region in which a user's touch occurs can be different from the size of a touch sensing signal received from a touch receiving electrode RX provided in a region in which a touch does not occur.

For example, when a user's finger is touched on the left upper end of the touch electrode unit 100b illustrated in FIG. 9, the sizes of touch sensing signals received from a first direction receiving electrode RX_X provided on the upper end of the touch electrode unit 100b and a second direction receiving electrode RX_Y provided on the left side of the touch electrode unit 100b can be different from the sizes of touch sensing signals received from first direction receiving electrodes RX_X and second direction receiving electrodes RX_Y provided in other areas.

Accordingly, the touch control unit or the control driver 400 can determine that a touch has occurred in an area adjacent to the first direction receiving electrode RX_X and the second direction receiving electrode RX_Y from which touch sensing signals having a larger size than other areas are received.

Accordingly, as illustrated in FIG. 9, the touch control unit or the control driver 400 can determine a region adjacent to a first direction receiving electrode RX_X provided on the upper end of the touch electrode unit 100b and a second direction block receiving electrode RX_YB provided on the upper end and left side of the touch electrode unit 100b as a touch area where a touch has occurred. Here, the second direction block receiving electrode RX_YB provided on the upper end and left side of the touch electrode unit 100b is one of second direction block receiving electrodes RX_YB included in a second direction receiving electrode RX_Y provided on the left side of the touch electrode unit 100b. Also, the second direction block receiving electrode RX_YB provided on the upper end and left side of the touch electrode unit 100b is an electrode adjacent to the first direction receiving electrode RX_X provided on the upper end of the touch electrode unit 100b.

To provide an additional description, in the touch electrode unit 100b illustrated in FIG. 9, one touch coordinates can be determined by the second direction block receiving electrode RX_YB. In this case, the touch coordinates can be determined by not only the second direction block receiving electrode RX_YB but also the first direction receiving electrode RX_X determined that there is a touch together with the second direction block receiving electrode RX_YB.

As described above, each of the second direction receiving electrodes RX_Y includes second direction block receiving electrodes RX_YB each of which is provided between the first direction receiving electrodes TX_X. The second direction block receiving electrodes RX_YB adjacent to each other along the second direction are connected through the second direction bridge receiving electrode RX_YBR provided along the second direction. Also, a first direction receiving electrode RX_X and a second direction block receiving electrode RX_YB adjacent to the first direction receiving electrode RX_X can form one unit touch area UTA.

Figure 11:
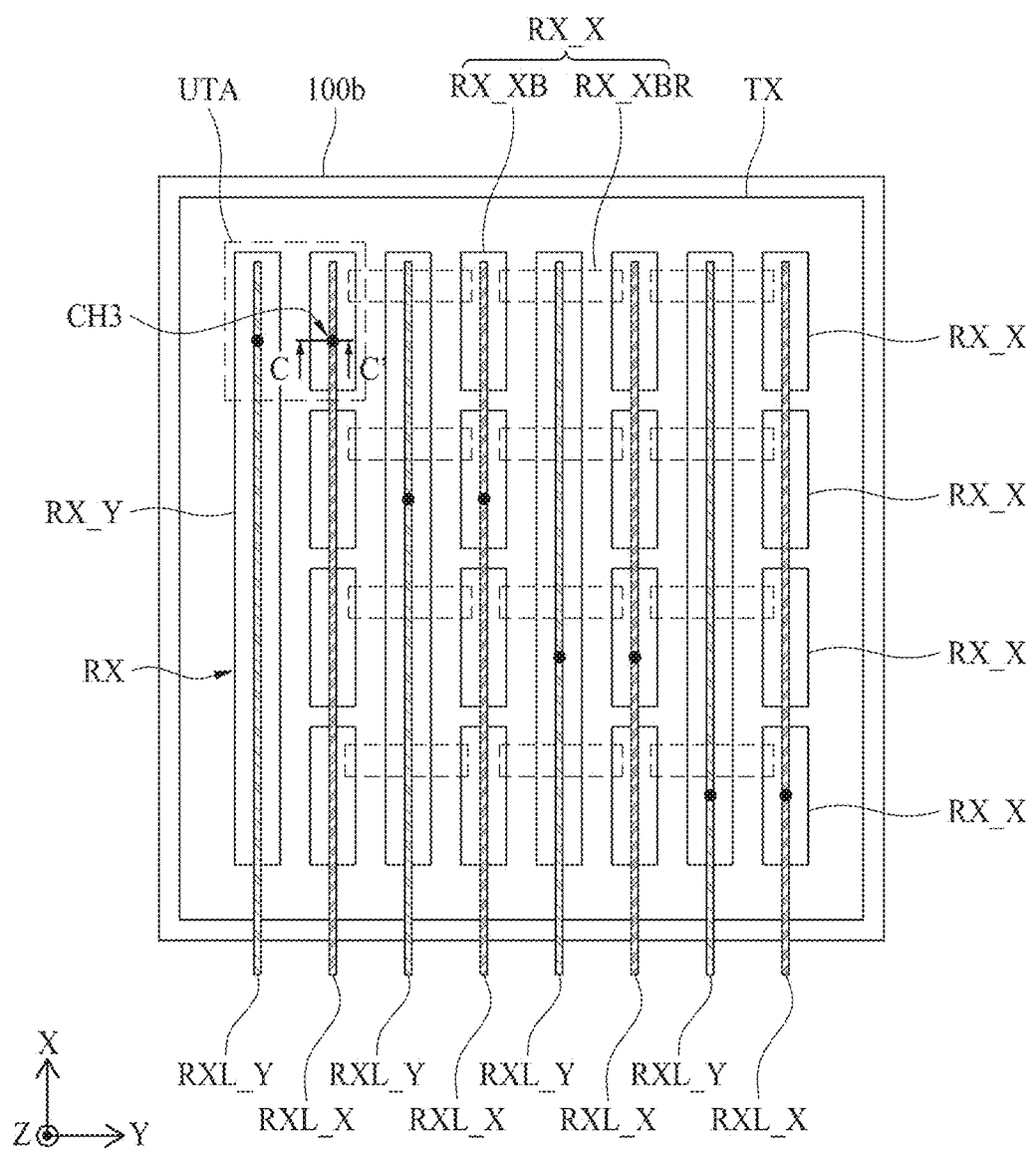
FIG. 11 is another exemplary diagram illustrating a structure of a touch electrode unit applied to a light emitting display apparatus according to an embodiment of the present disclosure.
Figure 12A:
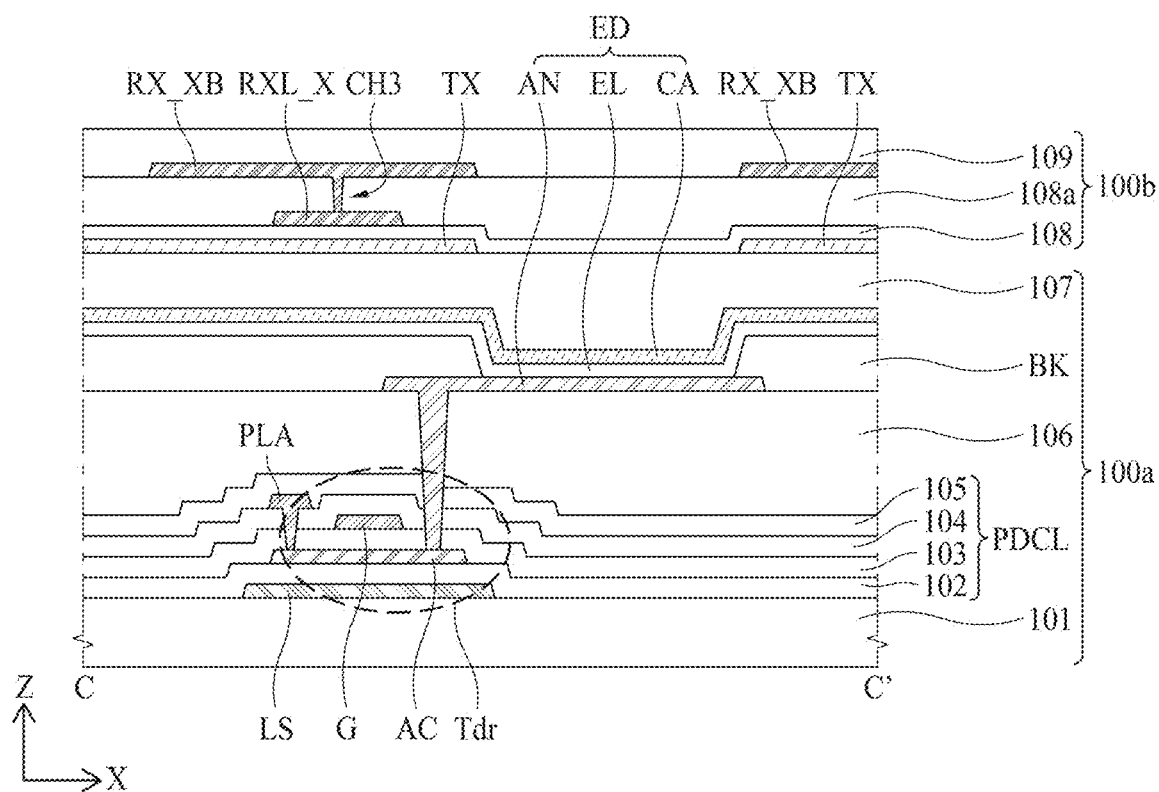
FIGS. 12A and 12B are exemplary diagrams illustrating a cross-sectional surface taken along line C-C' illustrated in FIG. 11 according to an embodiment of the present disclosure.
Figure 12B:
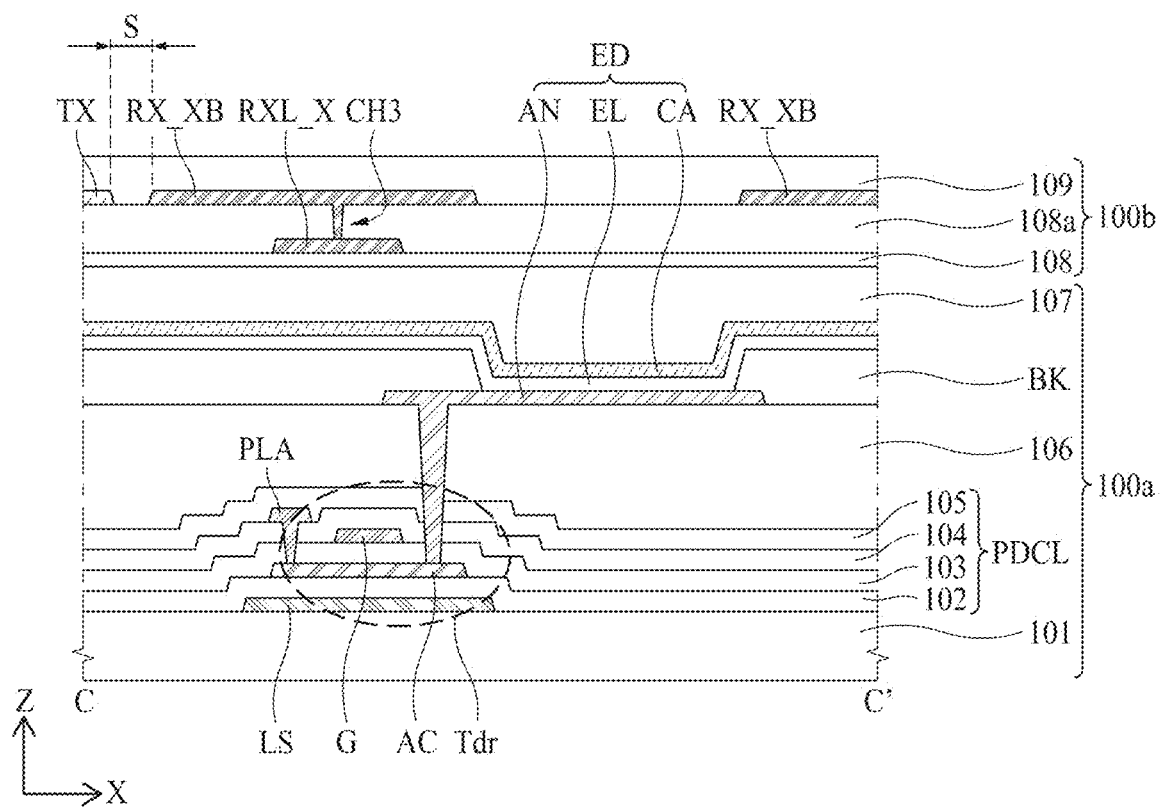

FIG. 11 is another exemplary diagram illustrating a structure of a touch electrode unit applied to a light emitting display apparatus according to an embodiment of the present disclosure, and FIGS. 12A and 12B are exemplary diagrams illustrating a cross-sectional surface taken along line C-C' illustrated in FIG. 11. In the following descriptions, details that are the same as or similar to details described with reference to FIGS. 7 to 10B are omitted or briefly described.

The light emitting display panel 100 can include, for example, a light emitting device unit 100a on which an image is displayed and a touch electrode unit 100b provided on the light emitting device unit 100a and provided for sensing a touch, as illustrated in FIGS. 11, 12A, and 12B.

First, the light emitting device unit 100a includes pixels P, and each of the pixels P can include a light emitting device ED, a pixel driving circuit PDC, a gate line GL, and a data line DL.

For example, the light emitting device unit 100a can include, as illustrated in FIGS. 12A and 12B, a substrate 101, a pixel driving circuit layer PDCL provided on the substrate 101, a planarization layer 106 covering the pixel driving circuit layer PDCL, an anode AN provided on the planarization layer, a bank BK covering ends of the anode AN, a light emitting layer EL covering the anode AN and the bank BK, a cathode CA covering the light emitting layer, and an encapsulation layer 107 covering the cathode CA.

Second, the touch electrode unit 100b can include touch electrodes TE for touch sensing, and the touch electrodes TE can include one touch driving electrode TX and touch receiving electrodes RX, as illustrated in FIGS. 11, 12A, and 12B.

For example, the touch electrode unit 100b includes touch receiving electrodes RX separated from each other and one touch driving electrode TX. The one touch driving electrode TX is spaced apart from the touch receiving electrodes RX with a touch insulation layer 108 interposed therebetween, and corresponds to the touch receiving electrodes RX.

In this case, the touch receiving electrodes RX can include first direction receiving electrodes RX_X and second direction receiving electrodes RX_Y, as illustrated in FIG. 11.

The second direction receiving electrodes RX_Y extend along a second direction Y different from the first direction X of the touch electrode unit 100b and are spaced apart from each other along the first direction X.

Each of the second direction receiving electrodes RX_Y can be formed in a single rod shape.

The first direction receiving electrodes RX_X extend along the first direction X of the touch electrode unit 100b and are spaced apart from each other along the second direction.

Each of the first direction receiving electrodes RX_X includes at least two first direction block receiving electrodes RX_XB and at least one first direction bridge receiving electrodes RX_XBR that connects together the two first direction block receiving electrodes RX_XB.

Each of the first direction block receiving electrodes RX_XB is provided between two second direction receiving electrodes RX_Y adjacent to each other.

Each of the first direction bridge receiving electrodes RX_XBR performs a function of connecting the first direction block receiving electrodes RX_XB spaced apart from each other with the second direction receiving electrode RX_Y interposed therebetween.

For example, each of the first direction receiving electrodes RX_X is continuously formed along the first direction X and includes the first direction block receiving electrodes RX_XB and the first direction bridge receiving electrodes RX_XBR.

A touch receiving electrode line RXL through which a touch sensing signal is transmitted is connected to each of the touch receiving electrodes RX, and a touch driving electrode line TXL through which a touch driving signal is transmitted is connected to the touch driving electrode TX.

The touch receiving electrode lines RXL can include first direction receiving electrode lines RXL_X and second direction receiving electrode lines RXL_Y.

For example, the first direction receiving electrode lines RXL_X connected to the first direction receiving electrodes RX_X extend in the second direction Y, and the second direction receiving electrode lines RXL_Y connected to the second direction receiving electrodes RX_Y extend in the second direction Y. That is, each second direction receiving electrode line RXL_Y is connected to a corresponding second direction receiving electrode RX_Y and each first direction receiving electrode line RXL_X connected to a corresponding first direction receiving electrode RX_X.

Therefore, the touch driving electrode TX can be connected to the touch driver 800 through the touch driving electrode line TXL, and each of the touch receiving electrodes RX can be connected to the touch driver 800 through the first direction receiving electrode line RXL_X or the second direction receiving electrode line RXL_Y.

In this case, one first direction receiving electrode line RXL_X can be provided between two second direction receiving electrode lines RXL_Y adjacent to each other. That is, a first direction receiving electrode line RXL_X is between a pair of second direction receiving electrode lines RXL_Y in a plan view of the light emitting display apparatus.

Accordingly, the second direction receiving electrode RX_Y and the first direction block receiving electrode RX_XB adjacent thereto can form one touch coordinate.

The touch driving electrode TX and the touch receiving electrodes RX can be provided in the touch electrode unit 100b in various structures.

For example, as illustrated in FIGS. 11 and 12A, the touch electrode unit 100b can include one touch driving electrode TX provided on the encapsulation layer 107 of the light emitting device unit 100a, a touch insulation layer 108 covering the touch driving electrode TX, first direction receiving electrode lines RXL_X and first direction bridge receiving electrodes RX_YBR provided on the touch insulation layer 108, a line cover layer 108a covering the first direction receiving electrode lines RXL_X and the first direction bridge receiving electrodes RX_XBR, first direction block receiving electrodes RX_XB connected to the first direction receiving electrode lines RXL_X through third contact holes CH3 provided in the line cover layer 108a, and a touch passivation layer 109 covering the first direction block receiving electrodes RX_XB.

The second direction receiving electrode line RXL_Y can connect the second direction receiving electrode RX_Y to the touch driver 800 in an area adjacent to the touch driver 800.

However, in order for the second direction receiving electrode line RXL_Y to have a resistance equal to or similar to that of the first direction receiving electrode line RXL_X, the second direction receiving electrode line RXL_Y can be provided along the second direction receiving electrode RX_Y, as illustrated in FIG. 11. In this case, the second direction receiving electrode line RXL_Y can be formed on a different layer from the first direction bridge receiving electrode RX_XBR. To this end, another insulation layer can be further provided.

First, the touch driving electrode TX can be formed in a shape of a single plate and can be provided on the entire surface of the touch electrode unit 100b.

The touch driving electrode TX can be formed of at least one of various types of transparent electrodes, can be formed of at least one of various types of opaque electrodes, or can be formed of at least one transparent electrode and at least one opaque electrode.

In this case, in order to prevent the light output from the light emitting device ED from being blocked by the touch driving electrode TX, or to improve the output efficiency of the light output from the light emitting device ED, the touch driving electrode TX may not be provided in a region in which the anodes AN are provided, as illustrated in FIG. 12. For example, holes passing through the touch driving electrode TX can be formed in regions corresponding to the anodes AN among the touch driving electrode TX.

Next, the touch driving electrode TX can be covered by the touch insulation layer 108.

Next, first direction receiving electrode lines RXL_X connected to the first direction receiving electrodes RX_X and first direction bridge receiving electrodes RX_XBR connected to the first direction block receiving electrodes RX_XB is provided on the touch insulation layer 108.

Next, the first direction receiving electrode lines RXL_X and the first direction bridge receiving electrodes RX_XBR can be covered by the line cover layer 108a.

Next, second direction receiving electrodes RX_Y and first direction block receiving electrodes RX_XB can be provided on the line cover layer 108a.

Each of the first direction block receiving electrodes RX_XB and first direction bridge receiving electrodes RX_XBR can be formed of at least one of various types of transparent electrodes, can be formed of at least one of various types of opaque electrodes, or can be formed of at least one transparent electrode and at least one opaque electrode.

The first direction block receiving electrode RX_XB and the first direction bridge receiving electrode RX_XBR can be formed of the same material or different materials.

In this case, in order to prevent light output from the light emitting device ED from being blocked by the first direction block receiving electrode RX_XB, or to improve output efficiency of light output from the light emitting device ED, the first direction block receiving electrode RX_XB may not be provided in a region in which the anodes AN are provided, as illustrated in FIG. 12. For example, holes passing through the first direction block receiving electrode RX_XB can be formed in regions corresponding to the anodes AN among the first direction block receiving electrode RX_XB.

To provide an additional description, when one first direction block receiving electrode RX_XB is provided continuously in at least two pixels, holes passing through the first direction block receiving electrode RX_XB can be formed in regions corresponding to at least two anodes AN provided in at least two pixels among the first direction block receiving electrode RX_XB.

Moreover, two different first direction block receiving electrodes RX_XB can be spaced apart from each other with the anode AN interposed therebetween.

The first direction block receiving electrode RX_XB can be connected to the first direction receiving electrode line RXL_X through a third contact hole CH3 provided in the line cover layer 108a.

Furthermore, the first direction block receiving electrode RX_XB can be connected to the first direction bridge receiving electrode RX_XBR through another contact hole provided in the line cover layer 108a. Each of the first direction block receiving electrodes RX_XB can be formed in a shape such as a diamond or a square, and in addition to this, can be formed in any one of various shapes of polygons.

The second direction receiving electrode RX_Y can be formed of the same material as that of the first direction block receiving electrode RX_XB. Holes passing through the second direction receiving electrode RX_Y can be formed in regions corresponding to the anodes AN, in the second direction receiving electrode RX_Y as well. Each of the second direction receiving electrodes RX_Y can be formed in a shape such as a diamond and a square, and in addition to this, can be formed in any one of various shapes of polygons.

Finally, the second direction receiving electrodes RX_Y and the first direction block receiving electrodes RX_XB can be covered by the touch passivation layer 109.

In the above description, the touch electrode unit 100b, in which the touch driving electrode TX is provided on the encapsulation layer 107 of the light emitting device unit 100a, and the second direction receiving electrodes RX_Y and the first direction block receiving electrodes RX_XB are provided on the touch driving electrode TX, has been described.

However, the second direction receiving electrodes RX_Y and the first direction block receiving electrodes RX_XB can be provided on the encapsulation layer of the light emitting device unit 100a, and the touch driving electrode TX can be provided on the second direction receiving electrodes RX_Y and the first direction block receiving electrodes RX_XB.

Moreover, the touch driving electrode TX, the second direction receiving electrode RX_Y, and the first direction block receiving electrode RX_XB can be provided on the light emitting device unit 100a in various stacked structures in addition to the stacked structure described with reference to FIG. 12A.

Hereinafter, another stacked structure of the touch electrode unit 100b will be described with reference to FIGS. 11 and 12B. In the following descriptions, details that are the same as or similar to details described with reference to FIGS. 11 and 12A will be omitted or briefly described.

For example, as illustrated in FIGS. 11 and 12B, the touch electrode unit 100b includes one touch driving electrode TX provided on the entire touch electrode unit 100b and touch receiving electrodes RX formed on the same layer as the touch driving electrode TX and provided in opening portions formed in the touch driving electrode.

More specifically, the touch electrode unit 100b can include first direction receiving electrode lines RXL_X and first direction bridge receiving electrodes RX_XBR provided on the encapsulation layer 107 of the light emitting device unit 100a, a line cover layer 108a covering the first direction receiving electrode lines RXL_X and the first direction bridge receiving electrodes RX_YBR, a touch driving electrode TX which is provided on the line cover layer 108a, forms an electrode, and includes opening portions, first direction block receiving electrodes RX_XB which are provided on the line cover layer 108a, are provided in the opening portions formed in the touch driving electrode TX, and are connected to the first direction bridge receiving electrode RX_XBR through third contact holes provided in the line cover layer 108a, second direction receiving electrodes RX_Y which are provided on the line cover layer 108, are provided in the opening portions formed in the touch driving electrode TX, are connected to the second direction receiving electrode lines RXL_Y through contact holes provided in the line cover layer 108a, and a touch passivation layer 109 covering the touch driving electrode TX, the second direction receiving electrode RX_Y, and the first direction block receiving electrode RX_XB. In this case, one opening portion formed in the touch driving electrode TX is provided with one second direction receiving electrode RX_Y or one first direction block receiving electrode RX_XB, and the touch driving electrode TX and the second direction receiving electrode RX_Y, or the touch driving electrode TX and the first direction block receiving electrode RX_XB are spaced apart by a preset interval S.

First, second direction receiving electrode lines RXL_Y connected to the second direction receiving electrodes RX_Y can be provided on the encapsulation layer 107.

For example, the second direction receiving electrode lines RXL_Y can be provided at ends of the second direction receiving electrodes RX_Y and connected to the touch driver 800. In this case, the second direction receiving electrode lines RXL_Y do not overlap the first direction bridge receiving electrodes RX_XBR. Therefore, the second direction receiving electrode lines RXL_Y can be formed on the same layer as the first direction bridge receiving electrodes RX_XBR, or can be formed on different layers from the first direction bridge receiving electrodes RX_XBR.

However, when the second direction receiving electrode line RXL_Y, as illustrated in FIG. 11, is provided along the second direction receiving electrode RX_Y, if the second direction receiving electrode line RXL_Y is provided on the same layer as the first direction bridge receiving electrode RX_XBR, the second direction receiving electrode line RXL_Y is in contact with the first direction bridge receiving electrode RX_XBR.

To prevent this, when the second direction receiving electrode line RXL_Y, as illustrated in FIG. 11, is provided along the second direction receiving electrode RX_Y, the second direction receiving electrode line RXL_Y can be provided on the encapsulation layer 107, and the first direction bridge receiving electrode RX_XBR can be provided on the touch insulation layer 108 covering the second direction receiving electrode line RXL_Y.

However, the second direction receiving electrode line RXL_Y is not necessarily provided on the encapsulation layer 107. For example, the second direction receiving electrode line RXL_Y can be provided on any one of the layers different from the layer in which the first direction bridge receiving electrode RX_XBR is provided, among various layers between the encapsulation layer 107 and the touch passivation layer 109.

Next, as described above, the second direction receiving electrode lines RXL_Y can be covered by the touch insulation layer 108, and the first direction bridge receiving electrodes RX_XBR connected to the first direction block receiving electrodes RX_XB and the first direction receiving electrode lines RXL_X connected to the first direction receiving electrodes RX_X can be provided on the touch insulation layer 108.

For example, the two first direction block receiving electrodes RX_XB, which are spaced apart from each other, can be connected by the first direction bridge receiving electrode RX_XBR.

The second direction receiving electrode lines RXL_Y and the first direction receiving electrode lines RXL_X can be provided along the second direction Y, and the first direction bridge receiving electrodes RX_XBR can be provided along the first direction X.

In this case, as described above, the second direction receiving electrode lines RXL_Y and the first direction bridge receiving electrodes RX_XBR are formed on different layers, so they are not in contact with each other and thus can be electrically separated.

Next, the first direction receiving electrode lines RXL_X and the first direction bridge receiving electrodes RX_XBR can be covered by the line cover layer 108a.

Next, the touch driving electrode TX can be provided on the line cover layer 108a.

The touch driving electrode TX, as described above, can be formed in a single plate shape and can be provided on the entire surface of the touch electrode unit 100b. An opening portion in which the touch receiving electrode RX is provided is formed in the touch driving electrode TX. For example, opening portions are provided in one touch driving electrode TX, and the second direction receiving electrode RX_Y or the first direction block receiving electrode RX_XB can be provided in each of the opening portions.

To provide an additional description, the touch driving electrode TX can be formed in an area other than areas (or light emitting areas) in which the anodes AN are provided and the opening portion in which the second direction receiving electrode RX_Y and the first direction block receiving electrode RX_XB are provided, in the touch electrode unit 100b, and thus can have a mesh structure. In particular, the touch driving electrode TX having a mesh structure can be provided in an area overlapping the bank BK.

Next, the second direction receiving electrodes RX_Y and the first direction block receiving electrodes RX_XB can be provided on the line cover layer 108a.

For example, the second direction receiving electrodes RX_Y and the first direction block receiving electrodes RX_XB can be formed on the same layer as the touch driving electrode TX.

In particular, each of the second direction receiving electrodes RX_Y can be provided in an opening portion formed in the touch driving electrode TX, and each of the first direction block receiving electrodes RX_XB can be formed in another opening portion formed in the touch driving electrode TX. Accordingly, the second direction receiving electrodes RX_Y and the first direction block receiving electrodes RX_XB can be separated in an island type.

The touch receiving electrode RX can be formed of at least one of various types of transparent electrodes, can be formed of at least one of various types of opaque electrodes, or can be formed of at least one transparent electrode and at least one opaque electrode.

Each of the second direction receiving electrodes RX_Y and the first direction block receiving electrode RX_XB can have a mesh structure. In particular, each of the second direction receiving electrodes RX_Y and the first direction block receiving electrode RX_XB having a mesh structure can be provided in a region overlapping the bank BK.

Each of the second direction receiving electrodes RX_Y and first direction block receiving electrodes RX_XB can be formed in a shape such as a diamond and a quadrangle, and in addition to this, can be formed in any one of various shapes of polygons. In particular, polygonal shapes such as a diamond and a quadrangle can be implemented in a mesh structure.

Finally, the touch driving electrode TX, the second direction receiving electrodes RX_Y, and the first direction block receiving electrodes RX_XB can be covered by the touch passivation layer 109.

As described above, the touch driving electrode TX, the second direction receiving electrodes RX_Y, and the first direction block receiving electrodes RX_XB can be formed on the same layer, and one second direction receiving electrode RX_Y or one first direction block receiving electrode RX_XB can be provided in each of the opening portions formed in the touch driving electrode TX. In this case, the second direction receiving electrode RX_Y or the first direction block receiving electrode RX_XB provided in the opening portion is spaced apart from the touch driving electrode TX by a preset interval S.

Third, a method of sensing a touch in the light emitting display apparatus described with reference to FIGS. 11, 12A, and 12B is as follows.

First, a touch driving signal generation unit 810 of the touch driver 800 can generate a touch driving signal under the control of the control driver 400.

The touch driving signal is supplied to the touch driving electrode TX through the touch driving electrode line TXL.

Because the area of the touch driving electrode TX is large, the resistance value of the touch driving electrode TX can be smaller than that of a conventional line-type touch driving electrode. Therefore, a voltage having a magnitude smaller than a voltage of a touch driving signal applied to a conventional light emitting display apparatus can be used as the touch driving signal.

Next, a touch sensing unit 820 of the touch driver 800 can simultaneously receive touch sensing signals from the first direction receiving electrode lines RXL_X connected to the first direction receiving electrodes RX_X and the second direction receiving electrode lines RXL_Y connected to the second direction receiving electrodes RX_Y, and can convert the received touch sensing signals into digital values.

Finally, a touch control unit of the touch driver 800 or the control driver 400 can determine whether a touch is present and a touch coordinate by using the digital values.

For example, the first direction receiving electrodes RX_X and the second direction receiving electrodes RX_Y overlap the touch driving electrode TX under the same condition.

In this case, the size of the touch sensing signal received from a touch receiving electrode RX provided in a region where a user's touch occurs can be different from the size of the touch sensing signal received from a touch receiving electrode RX provided in a region where a touch does not occur.

For example, when a user's finger is touched on the left upper end of the touch electrode unit 100*b* illustrated in FIG. 11, the sizes of touch sensing signals received from a first direction receiving electrode RX_X provided on the upper end of the touch electrode unit 100*b* and a second direction receiving electrode RX_Y provided on the left side of the touch electrode unit 100*b* can be different from the sizes of touch sensing signals received from first direction receiving electrodes RX_X and second direction receiving electrodes RX_Y provided in other areas.

Accordingly, the touch control unit or the control driver 400 can determine that a touch has occurred in an area adjacent to the first direction receiving electrode RX_X and the second direction receiving electrode RX_Y from which touch sensing signals having a larger size than other areas are received.

Therefore, as illustrated in FIG. 11, the touch control unit or the control driver 400 can determine a region adjacent to a first direction block receiving electrode RX_XB provided on the upper end and left side of the touch electrode unit 100*b* and a second direction receiving electrode RX_Y provided on the left side of the touch electrode unit 100*b* as a touch area where a touch has occurred. Here, the first direction block receiving electrode RX_XB provided on the upper end and left side of the touch electrode unit 100*b* is one of first direction block receiving electrodes RX_XB included in a first direction receiving electrode RX_X provided on the upper side of the touch electrode unit 100*b*. Also, the first direction block receiving electrode RX_XB provided on the upper end and left side of the touch electrode unit 100*b* is an electrode adjacent to the second direction receiving electrode RX_Y provided on the left side of the touch electrode unit 100*b*.

To provide an additional description, in the touch electrode unit 100*b* illustrated in FIG. 11, one touch coordinates can be determined by the first direction block receiving electrode RX_XB. In this case, the touch coordinates can be determined by not only the first direction block receiving electrode RX_XB but also the second direction receiving electrode RX_Y determined that there is a touch together with the first direction block receiving electrode RX_XB.

As described above, each of the first direction receiving electrodes RX_X includes first direction block receiving electrodes RX_XB each of which is provided between the second direction receiving electrodes TX_Y. The first direction block receiving electrodes RX_XB adjacent to each other along the first direction are connected through the first direction bridge receiving electrode RX_XBR provided along the first direction. Also, a second direction receiving electrode RX_Y and a first direction block receiving electrode RX_XB adjacent to the second direction receiving electrode RX_Y can form one unit touch area UTA.

According to a light emitting display apparatus according to an embodiment of the present disclosure described above, because the touch driving electrode is provided in the form of a single plate, the load of the touch driving electrode can be reduced.

Also, according to a light emitting display apparatus described with reference to FIGS. 7, 8A, and 8B, the touch receiving electrodes RX can be provided independently and can be formed in an island type. Accordingly, the load of the touch receiving electrodes RX can also be reduced.

Furthermore, the number of touch nodes applied to a light emitting display apparatus described with reference to FIGS. 9 to 12B can be smaller than the number of touch nodes applied to a light emitting display apparatus described with reference to FIGS. 7, 8A, and 8B.

The touch node means an end of the touch receiving electrode line RXL connected to the touch driver 800.

For example, the number of touch receiving electrode lines RXL in the light emitting display apparatus illustrated in FIGS. 7, 8A, and 8B is 16, and in this case, 16 touch coordinates can be generated.

Also, the number of touch receiving electrode lines RXL in the light emitting display apparatus illustrated in FIGS. 9 to 12B is 8, and in this case, 16 touch coordinates can be generated. However, in the light emitting display apparatus illustrated in FIGS. 9 to 12B, 32 touch coordinates can be generated.

For example, in the touch electrode unit 100*b* illustrated in FIG. 9, the unit touch area UTA can be determined by a second direction block receiving electrode RX_YB and a first direction receiving electrode RX_X provided at an upper end of the second direction block receiving electrode RX_YB. Also, the unit touch area UTA can be determined by the second direction block receiving electrode RX_YB and a first direction receiving electrode RX_X provided at a lower end of the second direction block receiving electrode RX_YB.

Therefore, one second direction block receiving electrode RX_YB can be used to generate two touch coordinates.

The touch sensing unit 820 can include a touch determination unit in order to determine whether a touch is present using a touch sensing signal received from the touch receiving electrode lines RXL, and the touch determination unit can be connected to each of the touch receiving electrode lines RXL.

Accordingly, in order to generate the same number of touch coordinates, the light emitting display apparatus illustrated in FIGS. 9 to 12B should have eight touch determination units, and the light emitting display apparatus illustrated in FIGS. 7, 8A, and 8B should have 16 touch determination units.

The number of touch determination units increases the manufacturing cost of a light emitting display apparatus and can complicate the manufacturing process of a light emitting display apparatus.

Accordingly, the light emitting display apparatus illustrated in FIGS. 9 to 12B can generate the same number of touch coordinates as the light emitting display apparatus illustrated in FIGS. 7, 8A, and 8B by using fewer touch determination units than the light emitting display apparatus illustrated in FIGS. 7, 8A, and 8B.

Accordingly, the manufacturing cost of a light emitting display apparatus can be reduced, and the manufacturing process of a light emitting display apparatus can be simplified.

Figure 13:
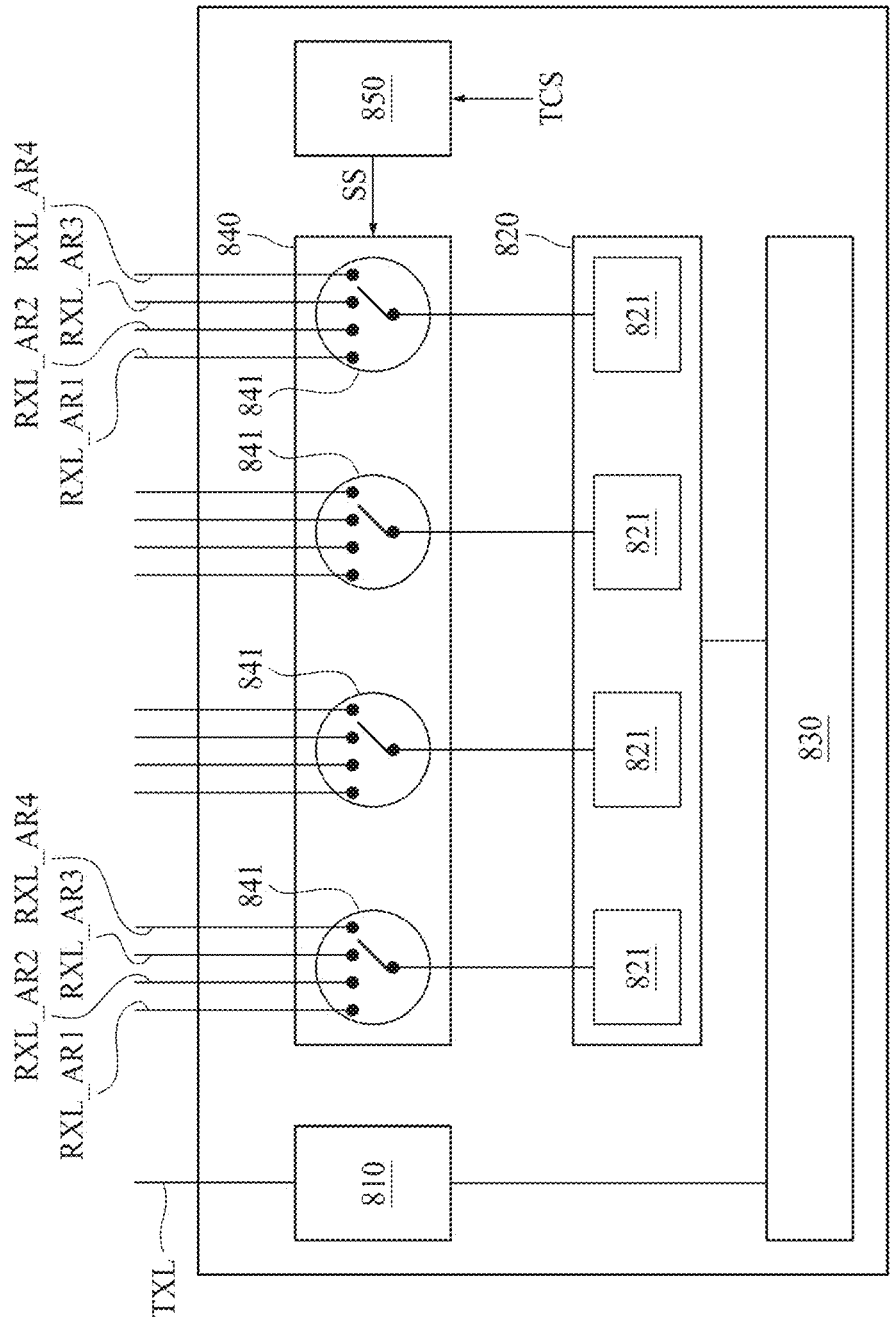
FIGS. 13 and 14 are exemplary diagrams illustrating a structure of a touch driver applied to a light emitting display apparatus according to an embodiment of the present disclosure.
Figure 14:
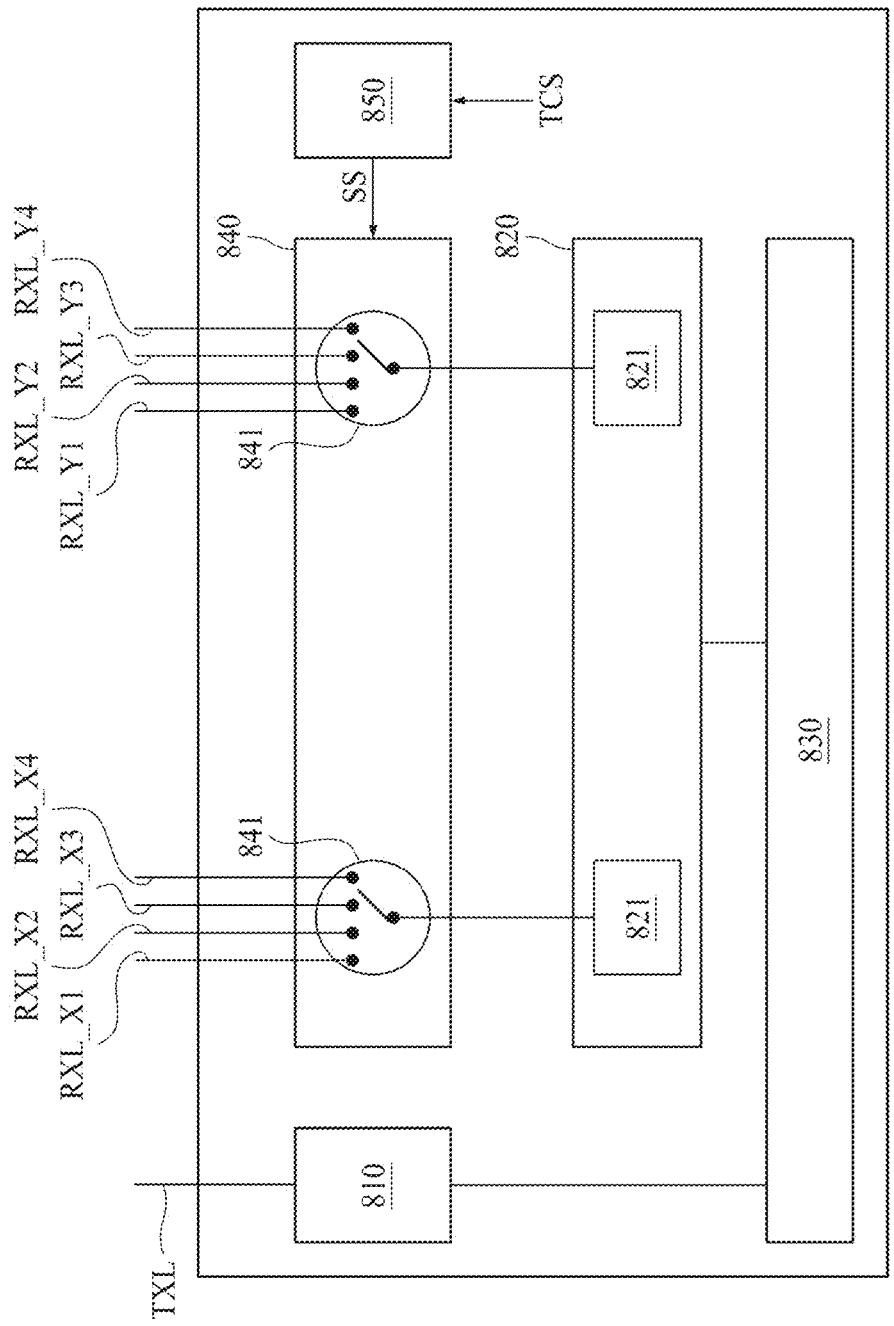
Figure 15:
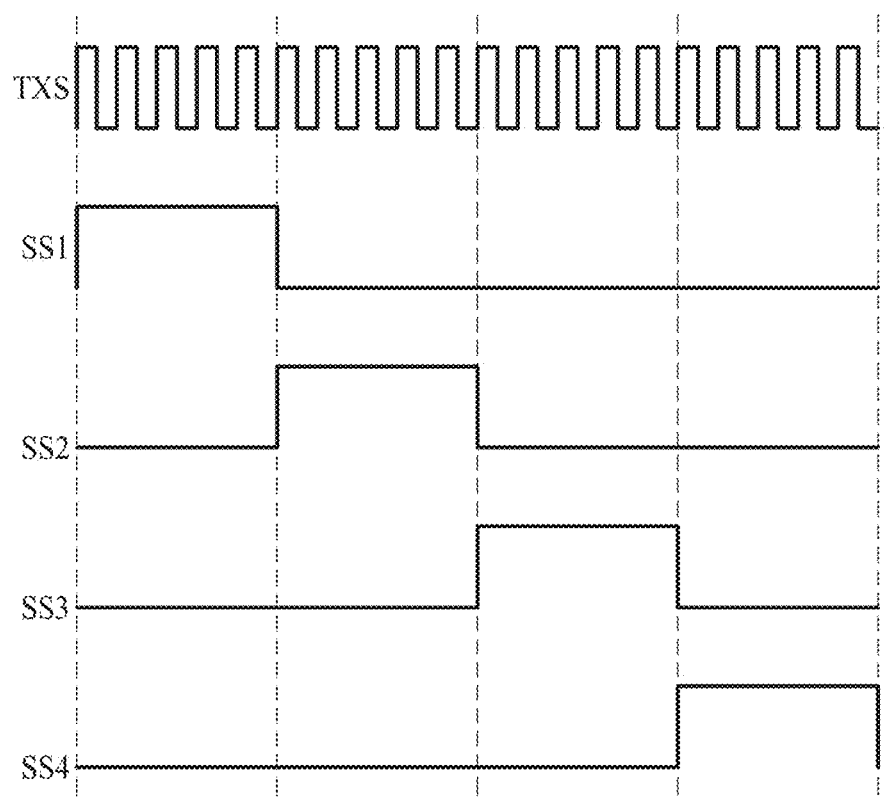
FIG. 15 is an exemplary diagram illustrating a touch driving signal and switching control signals applied to a light emitting display apparatus according to an embodiment of the present disclosure.

FIGS. 13 and 14 are exemplary diagrams illustrating a structure of a touch driver applied to a light emitting display apparatus according to an embodiment of the present disclosure, and FIG. 15 is an exemplary diagram illustrating a touch driving signal and switching control signals applied to a light emitting display apparatus according to an embodiment of the present disclosure. In the following descriptions, details that are the same as or similar to details described with reference to FIGS. 1 to 12B are omitted or briefly described.

First, as described above, a light emitting display apparatus according to an embodiment of the present disclosure includes a touch driver 800 to determine whether a touch is present using touch sensing signals received from the touch electrode unit 100*b*.

As illustrated in FIGS. 1, 13, and 14, the touch driver 800 includes a touch driving signal generation unit 810 (e.g., a circuit) that supplies a touch driving signal to the touch driving electrode TX and a touch sensing unit 820 (e.g., a circuit) that senses whether or not to touch using touch sensing signals received from the touch receiving electrodes RX. The touch sensing unit 820 can include touch determination units 821 (e.g., a circuit) connected to the touch receiving electrode lines RXL.

After supplying the touch driving signal to the touch driving electrode TX, the touch driver 800 simultaneously receives touch sensing signals from the touch receiving electrodes RX through the touch receiving electrode lines RXL, and the touch determination unit 821 can determine whether or not to touch using the received touch sensing signals.

The touch driver 800 can further include a touch control unit 830 (e.g., a circuit) to communicate with the control driver 400, and the touch control unit 830 can control the touch driving signal generation unit 810 and the touch sensing unit 820.

In this case, the touch determination units 821 can be connected to the touch receiving electrode lines RXL illustrated in FIGS. 7 to 12B in a one-to-one manner, so the touch determination units 821 can simultaneously analyze touch sensing signals received through the touch receiving electrode lines RXL to determine whether or not to touch.

To this end, the touch determination unit 821 can convert the touch sensing signal into a digital value and can determine whether or not to touch using the digital value.

However, the touch determination unit 821 can perform only a function of converting the touch sensing signal into the digital value.

In this case, the touch control unit 830 receiving digital values from the touch determination units 821 or the control driver 400 receiving digital values from the touch determination units 821, can determine whether or not to touch and generate touch coordinates using the digital values.

Next, in order to sequentially connect the touch receiving electrodes RX to the touch driver 800, the touch driver 800 can further include a switching unit 840 (e.g., a circuit), as illustrated in FIG. 13.

For example, the touch driver 800 can further include the switching unit 840 including at least two switches 841.

In this case, each of the switches 841 can sequentially connect at least two of the touch receiving electrode lines RXL connected to the touch receiving electrodes RX to the touch sensing unit 820.

In particular, each of the switches 841 is connected between at least two touch receiving electrode lines RXL and the touch determination unit 821, and can sequentially connect at least two touch receiving electrode lines RXL to the touch determination unit 821.

For example, as illustrated in FIG. 7, the touch receiving electrodes RX separated from each other can be provided in a first area AR1 provided along the first direction X of the touch electrode unit 100*b* and in a second area AR2 provided adjacent to the first area AR1 along the second direction Y different from the first direction X.

Here, each of the first area AR1 and the second area AR2 can extend in the first direction X, and the first area AR1 and the second area AR2 can be provided to be adjacent to each other in the second direction Y.

In this case, each of the switches 841 can connect any one of a first area touch receiving electrode RX_AR1 provided in the first area AR1 and a second area touch receiving electrode RX_AR2 provided in the second area AR2 to the touch sensing unit 820.

In this case, a first area touch receiving electrode RX_AR1 and a second area touch receiving electrode RX_AR2, which are connected to a switch 841, can be disposed adjacent to each other along the second direction.

For example, when the touch electrode unit 100*b* is, as illustrated in FIG. 7, divided into the first to fourth areas AR1 to AR4, four touch receiving electrodes RX are provided in each of the first to fourth areas AR1 to AR4.

In this case, the touch receiving electrodes RX provided in the first area AR1 are referred to as the first area touch receiving electrodes RX_AR1, the touch receiving electrodes RX provided in the second area AR2 are referred to as the second area touch receiving electrodes RX_AR2, the touch receiving electrodes RX provided in the third area AR3 are referred to as the third area touch receiving electrodes RX_AR3, and the touch receiving electrodes RX provided in the fourth area AR4 are referred to as the fourth area touch receiving electrodes RX_AR4.

Also, touch receiving electrode lines RXL connected to the first area touch receiving electrodes RX_AR1 are referred to as first area touch receiving electrode lines RXL_AR1, touch receiving electrode lines RXL connected to the second area touch receiving electrodes RX_AR2 are referred to as second area touch receiving electrode lines RXL_AR2, touch receiving electrode lines RXL connected to the third area touch receiving electrodes RX_AR3 are referred to as third area touch receiving electrode lines RXL_AR3, and touch receiving electrode lines RXL connected to the fourth area touch receiving electrodes RX_AR4 are referred to as fourth area touch receiving electrode lines RXL_AR4.

In this case, each of the switches 841 can sequentially connect a first area touch receiving electrode RX_AR1 in the first area AR1, a second area touch receiving electrode RX_AR2 in the second area AR2, a third area touch receiving electrode RX_AR3 in the third area AR3, and a fourth area touch receiving electrode RX_AR4 in the fourth area AR4 to the touch sensing unit 820. The first area touch receiving electrode RX_AR1, the second area touch receiving electrode RX_AR2, the third area touch receiving electrode RX_AR3, and the fourth area touch receiving electrode RX_AR4, which are sequentially connected to the switch 841, can be disposed adjacent to each other along the second direction Y.

To provide an additional description, as illustrated in FIG. 13, each of the switches 841 can be connected to the first area touch receiving electrode line RXL_AR1 connected to the first area touch receiving electrode RX_AR1, the second area touch receiving electrode line RXL_AR2 connected to the second area touch receiving electrode RX_AR2, the third area touch receiving electrode line RXL_AR3 connected to the third area touch receiving electrode RX_AR3, and the fourth area touch receiving electrode line RXL_AR4 connected to the fourth area touch receiving electrode RX_AR4, and each of the switches 841 can sequentially connect the four touch receiving electrode lines RXL_AR1 to RXL_AR4 to the touch sensing unit 820.

In this case, a first area touch receiving electrode RX_AR1, a second area touch receiving electrode RX_AR2, a third area touch receiving electrode RX_AR3, and a fourth area touch receiving electrode RX_AR4 connected to the touch receiving electrode lines RX_AR1 to RXL_AR4 connected to the switch 841 can be disposed adjacent to each other along the second direction Y.

Accordingly, when each of the four switches 841 illustrated in FIG. 13 connects the first area touch receiving electrode line RXL_AR1 to the touch sensing unit 820, whether or not to touch in the first area AR1 can be sensed.

Also, when each of the four switches 841 illustrated in FIG. 13 connects the second area touch receiving electrode line RXL_AR2 to the touch sensing unit 820, whether or not to touch in the second area AR2 can be sensed. Also, when each of the four switches 841 connects the third area touch receiving electrode line RXL_AR3 to the touch sensing unit 820, whether or not to touch in the third area AR3 can be sensed. Also, when each of the four switches 841 connects the fourth area touch receiving electrode line RXL_AR4 to the touch sensing unit 820, whether or not to touch in the fourth area AR4 can be sensed.

To provide an additional description, under the control of the touch control unit 830 or the control driver 400, the switching control unit 850 (e.g., a circuit) can generate a switching control signal SS.

While the touch driving signal TXS is supplied to the touch driving electrode TX, the switching control unit 850 can sequentially generate the first to fourth switching control signals SS1 to SS4, as illustrated in FIG. 15.

According to the first switching control signal SS1, the four switches 841 can connect the first area touch receiving electrode lines RXL_AR1 to the touch sensing unit 820, and accordingly, whether or not to touch in the first area AR1 is sensed can be sensed.

Also, by the second switching control signal SS2, the four switches 841 can connect the second area touch receiving electrode lines RXL_AR2 to the touch sensing unit 820, and accordingly, whether or not to touch in the second area AR2 can be sensed. By the third switching control signal SS3, the four switches 841 can connect the third area touch receiving electrode lines RXL_AR3 to the touch sensing unit 820, and accordingly, whether or not to touch in the third area AR3 can be sensed. By the fourth switching control signal SS4, the four switches 841 can connect the fourth area touch receiving electrode lines RXL_AR4 to the touch sensing unit 820, and accordingly, whether or not to touch in the fourth area AR4 can be sensed.

When the light emitting display apparatus according to an embodiment of the present disclosure includes the switching unit 840 and the switching control unit 850 as described above, and the switches 841 sequentially connect the touch receiving electrode lines RXL to the touch sensing unit 820, the number of the touch determination units 821 provided in the touch sensing unit 820 can be further reduced.

For example, the touch receiving electrode lines RXL provided in the touch electrode unit 100b illustrated in FIG. 7 are connected to the touch sensing unit 820, and 16 touch determination units 821 should be provided in the touch sensing unit 820 in order to supply touch sensing signals to the touch sensing unit 820 at the same time through the touch receiving electrode lines RXL.

However, as described with reference to FIG. 13, when the touch receiving electrode lines RXL illustrated in FIG. 7 are divided into four groups, and when each of the switches 841 sequentially connects the four touch receiving electrode lines RXL_AR1, RXL_AR2, RXL_AR3, and RXL_AR4 included in the four groups to the touch sensing unit 820, the touch sensing unit 820 can be provided with four touch determination units 821.

Therefore, the number of the touch determination units 821 (e.g., analog front end (AFE)) can be reduced compared to the conventional light emitting display apparatus, and the number of touch determination units 821 can be further reduced compared to the embodiment in which 16 touch determination units 821 are provided.

Accordingly, the manufacturing cost of a light emitting display apparatus can be further reduced, and the manufacturing process of a light emitting display apparatus can be further simplified.

Finally, in order to sequentially connect the touch receiving electrodes RX to the touch driver 800, the touch driver applied to a light emitting display apparatus according to an embodiment of the present disclosure can include a switching unit 840 as illustrated in FIG. 14.

For example, the touch driver 800 can further include a switching unit 840 including at least two switches 841.

In this case, each of the switches 841 can sequentially connect at least two of the touch receiving electrode lines RXL connected to the touch receiving electrodes RX to the touch sensing unit 820.

In particular, each of the switches 841 can be connected between at least two touch receiving electrode lines RXL and the touch determination unit 821, and each of the switches 841 can sequentially connect at least two touch receiving electrode lines RXL to the touch determination unit 821.

For example, as illustrated in FIG. 9, when the touch receiving electrodes RX include the first direction receiving electrodes RX_X and the second direction receiving electrodes RX_Y, each of the switches 841 can sequentially connect the first direction receiving electrodes RX_X to the touch sensing unit 820, and can sequentially connect the second direction receiving electrodes RX_Y to the touch sensing unit 820.

For example, as illustrated in FIG. 9, when the touch receiving electrodes RX include the first direction receiving electrodes RX_X and the second direction receiving electrodes RX_Y, for convenience of explanation, hereinafter, RXL_X1, RXL_X2, RXL_X3, and RXL_X4 are used as reference numerals of the four first direction receiving electrode lines RXL_X.

Also, RXL_Y1, RXL_Y2, RXL_Y3, and RXL_Y4 are used as reference numerals of the four second direction receiving electrode lines RXL_Y.

In this case, as illustrated in FIG. 14, one switch can sequentially connect the four first direction receiving electrode lines RXL_X1, RXL_X2, RXL_X3, and RXL_X4 to the touch sensing unit 820, and the other switch can sequentially connect the four second direction receiving electrode lines RXL_Y1, RXL_Y2, RXL_Y3, and RXL_Y4 to the touch sensing unit 820.

In this case, when the first direction receiving electrode line RXL_X1 connected to the first direction receiving electrode RX_X1 provided at the upper end in FIG. 9 is connected to the touch sensing unit 820, and the second direction receiving electrode line RXL_Y1 provided at the left in FIG. 9 is connected to the touch sensing unit, whether a touch is present in the unit touch area UTA illustrated in FIG. 9 and a touch coordinate of the unit touch area UTA can be determined.

When the four second direction receiving electrode lines RXL_Y1, RXL_Y2, RXL_Y3, and RXL_Y4 are sequentially connected to the touch sensing unit 820 in the state that the first direction receiving electrode lines RXL_X1 provided at the upper end in FIG. 9 are connected to the touch sensing unit 820, whether a touch is present and a touch coordinate in the four unit touch areas UTA corresponding to the first direction receiving electrode RX_X1 provided at the upper end can be sequentially determined.

When the four second direction receiving electrode lines RXL_Y1, RXL_Y2, RXL_Y3, and RXL_Y4 are sequentially connected to the touch sensing unit 820 in the state that the first direction receiving electrode lines RXL_X4 provided at the lower end in FIG. 9 are connected to the touch sensing unit 820, whether a touch is present and a touch coordinate in the four unit touch areas UTA corresponding to the first direction receiving electrode RX_X4 provided at the lower end can be sequentially determined.

However, the switching unit 840 can be connected to the receiving electrode lines RXL in a structure different from the structure described above, and the switching unit 840 can connect the receiving electrode lines RXL to the touch sensing unit 820 in a method different from the method described above.

For example, one switch 841 can sequentially connect the first direction receiving electrode lines RXL_X1, RXL_X2, RXL_X3, and RXL_X4 to the touch sensing unit 820, and the other switch 841 can simultaneously connect the four second direction receiving electrode lines RXL_Y1, RXL_Y2, RXL_Y3, and RXL_Y4 to the touch sensing unit 820.

In this case, whether or not to touch and touch coordinates in the four unit touch areas UTA corresponding to the first direction receiving electrode RX_X connected to the touch sensing unit 820 can be simultaneously determined.

Moreover, when the first direction receiving electrode lines RXL_X are divided into a first group and a second group, a first switch can sequentially connect the first direction receiving electrode lines RXL_X included in the first group to the touch determination unit 841, and a second switch can sequentially connect the first direction receiving electrode lines RXL_X included in the second group to the touch determination unit 841.

In this case, a third switch can simultaneously or sequentially connect the second direction receiving electrode lines RXL_Y to the touch determination unit 841.

Furthermore, when the number of first direction receiving electrode lines RXL_X and the number of second direction receiving electrode lines RXL_Y increase further, more switches 841 can be provided in the switching unit 840 to connect the first direction receiving electrode lines RXL_X to the touch sensing unit 820 in various ways, and more switches 841 can be provided in the switching unit 840 to connect the second direction receiving electrode lines RXL_Y to the touch sensing unit 820 in various ways.

To provide an additional description, the first direction receiving electrode lines RXL_X and the second direction receiving electrode lines RXL_Y can be connected to the touch sensing unit 820 through various methods, and to this end, switches provided in the touch sensing unit 820 can be connected to at least two receiving electrode lines RXL.

Also, even when the touch electrode unit 100b is configured in a structure as illustrated in FIG. 11, the first direction receiving electrode lines RXL_X and the second direction receiving electrode lines RXL_Y can be connected to the touch sensing unit 820 through various methods, and to this end, the switches provided in the touch sensing unit 820 can be connected to at least two receiving electrode lines RXL.

In this case, each of the switches 841 can be driven by the switching control signal SS transmitted from the switching control unit 850.

When the switching unit 840 as described above is included in the touch driver 800 of the light emitting display apparatus according to an embodiment of the present disclosure, the first direction receiving electrode lines RXL_X can be sequentially connected to the touch sensing unit 820, and the second direction receiving electrode lines RXL_Y can be sequentially connected to the touch sensing unit 820.

Accordingly, the number of touch determination units 821 provided in the touch sensing unit 820 can be reduced than the number of touch determination units 821 when the first direction receiving electrode lines RXL_X and the second direction receiving electrode lines RXL_Y are connected at the same time.

Accordingly, the manufacturing cost of a light emitting display apparatus can be further reduced, and the manufacturing process of a light emitting display apparatus can be further simplified.

The features of the light emitting display apparatus according to an embodiment of the present disclosure are briefly summarized as follows.

A light emitting display apparatus according to an embodiment of the present disclosure includes a light emitting device unit including light emitting devices; and a touch electrode unit disposed on the light emitting device unit, wherein the touch electrode unit includes: touch receiving electrodes separated from each other; and a touch driving electrode disposed to be spaced apart from the touch receiving electrodes and corresponding to the touch receiving electrodes.

The light emitting display apparatus further includes a touch receiving electrode line connected to each of the touch receiving electrodes and transmitting a touch sensing signal generated from each of the touch receiving electrodes, wherein the touch receiving electrode line is provided on a layer different from the touch receiving electrodes.

The touch receiving electrodes includes: first direction receiving electrodes extending along a first direction of the touch electrode unit and spaced apart from each other along a second direction different from the first direction; and second direction receiving electrodes extending along the second direction and spaced apart from each other along the first direction, and each of the second direction receiving electrodes includes at least two second direction block receiving electrodes and at least one second direction bridge receiving electrode.

First direction receiving electrode lines connected to the first direction receiving electrodes extend in the second direction, and second direction receiving electrode lines connected to the second direction receiving electrodes extend in the second direction.

One second direction receiving electrode line is provided between two first direction receiving electrode lines adjacent to each other.

The touch receiving electrodes includes: second direction receiving electrodes extending along a second direction different from a first direction of the touch electrode unit and spaced apart from each other along the first direction; and first direction receiving electrodes extending along the first direction and spaced apart from each other along the second direction, and each of the first direction receiving electrodes includes at least two first direction block receiving electrodes and at least one first direction bridge receiving electrode.

Second direction receiving electrode lines connected to the second direction receiving electrodes extend in the second direction, and first direction receiving electrode lines connected to the first direction receiving electrodes extend in the second direction.

One first direction receiving electrode line is provided between two second direction receiving electrode lines adjacent to each other.

A first direction block receiving electrode is provided between the first direction receiving electrodes adjacent to each other, first direction block receiving electrodes adjacent to each other along the first direction are connected through a first direction bridge receiving electrode provided along the first direction, and a second direction receiving electrode and a first direction block receiving electrode adjacent to the second direction receiving electrode form one unit touch area.

The light emitting display apparatus further includes a touch driver for receiving touch sensing signals from the touch receiving electrodes, wherein the touch receiving electrodes are sequentially connected to the touch driver.

The light emitting display apparatus further includes a touch driver, wherein the touch driver includes: a touch driving signal generation unit which supplies a touch driving signal to the touch driving electrode; a touch sensing unit which senses whether a touch is present using touch sensing signals received from the touch receiving electrodes; and a switching unit including at least two switches, and each of the switches sequentially connects at least two of touch receiving electrode lines connected to the touch receiving electrodes to the touch sensing unit.

The touch receiving electrodes are provided in a first area provided along a first direction of the touch electrode unit and a second area provided adjacent to the first area along a second direction different from the first direction, and each of the switches connects any one of a first area touch receiving electrode provided in the first area and a second area touch receiving electrode provided in the second area to the touch sensing unit.

A first area touch receiving electrode and a second area touch receiving electrode which are connected to any one of the switches are provided adjacent to each other along the second direction.

The light emitting display apparatus further includes a touch driver for receiving touch sensing signals from the touch receiving electrodes, wherein the first direction receiving electrodes are sequentially connected to the touch driver, and the second direction receiving electrodes are sequentially connected to the touch driver.

The touch receiving electrodes and the touch driving electrode are spaced apart from each other on the same layer.

The touch driving electrode includes opening portions, and the touch receiving electrodes are provided in the opening portions.

The light emitting display apparatus according to the present disclosure can be applied to all electronic devices including a light emitting display panel. For example, the light emitting display apparatus according to the present disclosure can be applied to a virtual reality (VR) device, an augmented reality (AR) device, a mobile device, a video phone, a smart watch, a watch phone, or a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

According to a light emitting display apparatus according to an embodiment of the present disclosure, the touch driving electrode can be formed in a shape of a single plate, and accordingly, the load of the touch driving electrode can be reduced.

According to a light emitting display apparatus according to an embodiment of the present disclosure, the touch receiving electrodes can be separated in an island type, and accordingly, the load of the touch receiving electrodes can be reduced.

According to a light emitting display apparatus according to an embodiment of the present disclosure, the rod-shaped touch receiving electrodes can be disposed in the first and second directions, and accordingly, the number of touch receiving electrode lines through which the touch sensing signals are transmitted can be reduced.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. A light emitting display apparatus comprising:
a light emitting device unit including a plurality of light emitting devices; and
a touch electrode unit on the light emitting device unit, the touch electrode unit including:
a plurality of touch receiving electrodes that are separated from each other;
a touch driving electrode that is spaced apart from the plurality of touch receiving electrodes and overlaps the plurality of touch receiving electrodes; and
a plurality of touch receiving electrode lines, each touch receiving electrode line connected to a corresponding touch receiving electrode from the plurality of touch receiving electrodes and transmitting a touch sensing signal generated from the corresponding touch receiving electrode,
wherein the plurality of touch receiving electrode lines are on a different layer from the plurality of touch receiving electrodes,
wherein the plurality of touch receiving electrodes includes:
a plurality of first direction receiving electrodes that extend along a first direction and are spaced apart from each other along a second direction that is different from the first direction, and
a plurality of second direction receiving electrodes that extend along the second direction and are spaced apart from each other along the first direction,
wherein each of the plurality of second direction receiving electrodes includes at least two second direction block receiving electrodes and at least one second direction bridge receiving electrode that connects together the at least two second direction block receiving electrodes, wherein the at least one second direction bridge receiving electrode is on a different layer from the plurality of touch receiving electrode lines, and the plurality of touch receiving electrodes, wherein the at least one second direction bridge receiving electrode extends along the second direction, wherein each touch receiving electrode line extends along the first direction, and at least one touch receiving electrode line of the plurality of touch receiving electrode lines overlaps each at least one second direction bridge receiving electrode of the plurality of touch receiving electrodes and at least one first direction receiving electrode.

2. The light emitting display apparatus of claim 1, wherein the plurality of touch receiving electrodes are arranged in a plurality of rows of touch receiving electrodes and a plurality of columns of touch receiving electrodes, wherein the touch driving electrode overlaps the plurality of rows of touch receiving electrodes and the plurality of columns of touch receiving electrodes in a plan view of the light emitting display apparatus.

3. The light emitting display apparatus of claim 1, further comprising:

a plurality of first direction receiving electrode lines that extend in the second direction, each first direction receiving electrode line connected to a corresponding first direction receiving electrode from the plurality of first direction receiving electrodes, and a plurality of second direction receiving electrode lines extending in the second direction, each second direction receiving electrode line connected to a corresponding second direction receiving electrode from the plurality of second direction receiving electrodes.

4. The light emitting display apparatus of claim 3, wherein a second direction receiving electrode line from the plurality of second direction receiving electrode lines is between a pair of first direction receiving electrode lines from the plurality of first direction receiving electrode lines in a plan view of the light emitting display apparatus.

5. The light emitting display apparatus of claim 1, further comprising:

a touch driver configured to receive touch sensing signals from the plurality of touch receiving electrodes, wherein the plurality of touch receiving electrodes are sequentially connected to the touch driver.

6. The light emitting display apparatus of claim 1, further comprising a touch driver that includes:

a touch driving signal generation circuit configured to supply a touch driving signal to the touch driving electrode;

a touch sensing circuit configured to sense a touch using touch sensing signals received from the plurality of touch receiving electrodes; and a switching unit including a plurality of switches, each of the switches sequentially connecting at least two touch receiving electrode lines that are connected to the plurality of touch receiving electrodes to the touch sensing circuit.

7. The light emitting display apparatus of claim 6, wherein a first portion of the plurality of touch receiving electrodes are in a first area of the touch electrode unit and are disposed along a first direction and a second portion of the plurality of touch receiving electrodes are in a second area of the touch electrode unit that is adjacent to the first area and disposed along a second direction that is different from the first direction, and each of the plurality of switches connects any one of a first touch receiving electrode from the plurality of touch receiving electrodes that is in the first area and a second touch receiving electrode from the plurality of touch receiving electrodes that is in the second area to the touch sensing circuit.

8. The light emitting display apparatus of claim 7, wherein the first touch receiving electrode and the second touch receiving electrode which are connected to any one of the plurality of switches are adjacent to each other along the second direction.

9. The light emitting display apparatus of claim 1, further comprising:

a touch driver configured to receive touch sensing signals from the plurality of touch receiving electrodes, wherein the plurality of first direction receiving electrodes are sequentially connected to the touch driver, and the plurality of second direction receiving electrodes are sequentially connected to the touch driver.

10. A light emitting display apparatus comprising:

a light emitting device unit including a plurality of light emitting devices; and a touch electrode unit on the light emitting device unit, the touch electrode unit including:

a touch driving electrode configured to receive a touch driving signal, the touch driving electrode comprising a plurality of sides;

a plurality of touch receiving electrodes that are separated from each other, the plurality of touch receiving electrodes overlapping the touch driving electrode such that the plurality of touch receiving electrodes are disposed in an area enclosed by the plurality of sides of the touch driving electrode in a plan view of the light emitting display apparatus; and a plurality of touch receiving electrode lines, each touch receiving electrode line connected to a corresponding touch receiving electrode from the plurality of touch receiving electrodes and transmitting a touch sensing signal generated from the corresponding touch receiving electrode, wherein the plurality of touch receiving electrode lines are on a different layer from the plurality of touch receiving electrodes, wherein the plurality of touch receiving electrodes includes:

a plurality of first direction receiving electrodes that extend along a first direction and are spaced apart from each other along a second direction that is different from the first direction, and a plurality of second direction receiving electrodes that extend along the second direction and are spaced apart from each other along the first direction, wherein each of the plurality of second direction receiving electrodes includes at least two second direction block receiving electrodes and at least one second direction bridge receiving electrode that connects together the at least two second direction block receiving electrodes, wherein the at least one second direction bridge receiving electrode is on a different layer from the plurality of touch receiving electrode lines, and the plurality of touch receiving electrodes, wherein the at least one second direction bridge receiving electrode extends along the second direction, wherein each touch receiving electrode line extends along the first direction, and at least one touch receiving electrode line of the plurality of touch receiving electrode lines overlaps each at least one second direction bridge receiving electrode of the plurality of touch receiving electrodes and at least one first direction receiving electrode.

11. The light emitting display apparatus of claim 10, wherein the plurality of touch receiving electrodes do not extend past the plurality of sides of the touch driving electrode in the plan view.

12. The light emitting display apparatus of claim 10, wherein the touch driving electrode is on a different layer from the plurality of touch receiving electrodes.

13. A light emitting display apparatus comprising:
a light emitting device unit including a plurality of light emitting devices; and
a touch electrode unit on the light emitting device unit, the touch electrode unit including:
  a plurality of touch receiving electrodes that are separated from each other; and
  a touch driving electrode that is spaced apart from the plurality of touch receiving electrodes and overlaps the plurality of touch receiving electrodes; and
  a plurality of touch receiving electrode lines, each touch receiving electrode line connected to a corresponding touch receiving electrode from the plurality of touch receiving electrodes and transmitting a touch sensing signal generated from the corresponding touch receiving electrode,
wherein the plurality of touch receiving electrode lines are on a different layer from the plurality of touch receiving electrodes,
wherein the plurality of touch receiving electrodes includes:
  a plurality of first direction receiving electrodes that extend along a first direction and are spaced apart from each other along a second direction that is different from the first direction; and
  a plurality of second direction receiving electrodes that extend along the second direction and are spaced apart from each other along the first direction,
  wherein each of the plurality of second direction receiving electrodes includes at least two second direction block receiving electrodes and at least one second direction bridge receiving electrode that connects together the at least two second direction block receiving electrodes,
  wherein the at least one second direction bridge receiving electrode on the same layer as the plurality of touch receiving electrode lines,
  wherein the at least one second direction bridge receiving electrode extends along the second direction,
  wherein the plurality of touch receiving electrode lines extends along the second direction.

14. A light emitting display apparatus comprising:
a light emitting device unit including a plurality of light emitting devices; and
a touch electrode unit on the light emitting device unit, the touch electrode unit including:
  a touch driving electrode configured to receive a touch driving signal, the touch driving electrode comprising a plurality of sides;
  a plurality of touch receiving electrodes that are separated from each other, the plurality of touch receiving electrodes overlapping the touch driving electrode such that the plurality of touch receiving electrodes are disposed in an area enclosed by the plurality of sides of the touch driving electrode in a plan view of the light emitting display apparatus, and
  a plurality of touch receiving electrode lines, each touch receiving electrode line connected to a corresponding touch receiving electrode from the plurality of touch receiving electrodes and transmitting a touch sensing signal generated from the corresponding touch receiving electrode,
wherein the plurality of touch receiving electrode lines are on a different layer from the plurality of touch receiving electrodes,
wherein the plurality of touch receiving electrodes includes:
  a plurality of first direction receiving electrodes that extend along a first direction and are spaced apart from each other along a second direction that is different from the first direction; and
  a plurality of second direction receiving electrodes that extend along the second direction and are spaced apart from each other along the first direction,
  wherein each of the plurality of second direction receiving electrodes includes at least two second direction block receiving electrodes and at least one second direction bridge receiving electrode that connects together the at least two second direction block receiving electrodes,
  wherein the at least one second direction bridge receiving electrode on the same layer as the plurality of touch receiving electrode lines,
  wherein the at least one second direction bridge receiving electrode extends along the second direction,
  wherein the plurality of touch receiving electrode lines extends along the second direction.

* * * * *